(12) United States Patent
Kim

(10) Patent No.: US 12,144,034 B2
(45) Date of Patent: Nov. 12, 2024

(54) METHOD AND APPARATUS FOR RANDOM ACCESS IN WIRELESS MOBILE COMMUNICATION SYSTEM

(71) Applicants: BLACKPIN Inc., Seoul (KR); Soenghun Kim, Hanam-si (KR); SIGNALIS CO., LTD., Daejeon (KR)

(72) Inventor: Soenghun Kim, Hanam-si (KR)

(73) Assignees: BLACKPIN Inc., Seoul (KR); Soenghun Kim, Hanam-si (KR); SIGNALIS CO., LTD., Daejeon (KR)

(*) Notice: Subject to any disclaimer, the term of this patent is extended or adjusted under 35 U.S.C. 154(b) by 0 days.

(21) Appl. No.: 18/542,785

(22) Filed: Dec. 18, 2023

(65) Prior Publication Data

US 2024/0121831 A1    Apr. 11, 2024

Related U.S. Application Data

(63) Continuation of application No. PCT/KR2023/001710, filed on Feb. 7, 2023.

(30) Foreign Application Priority Data

Feb. 7, 2022    (KR) .................. 10-2022-0015439

(51) Int. Cl.
*H04W 72/04*    (2023.01)
*H04W 74/0833*    (2024.01)
(Continued)

(52) U.S. Cl.
CPC ............... *H04W 74/0833* (2013.01)

(58) Field of Classification Search
CPC ................................. H04W 74/0833
(Continued)

(56) References Cited

U.S. PATENT DOCUMENTS

2023/0388971 A1*  11/2023  Bergström ........ H04W 74/0833

FOREIGN PATENT DOCUMENTS

| KR | 10-2019-0014113 A | 2/2019 |
| KR | 10-2021-0011066 A | 1/2021 |

(Continued)

OTHER PUBLICATIONS

Ericsson (R2-2201553, "RACH partitioning for Rel-17 features", Jan. 17, 2022-Jan. 25, 2022). (Year: 2022).*
(Continued)

*Primary Examiner* — Maharishi V Khirodhar
(74) *Attorney, Agent, or Firm* — PnK IP LLC

(57) ABSTRACT

A Method and Apparatus to address problem of RACH resource partitioning. The method includes receiving SIB1 from the base station, determining an uplink for a random access procedure based on rsrpThresholdSSB-SUL, determining a first target feature combination, determining that the CE is applicable based on rsrp-ThresholdSSB-CE, determining a second target feature combination by adding CE in the first target feature combination, selecting a second RACH-ConfigCommon based on the comparison between the target feature combination and the one or more feature combinations associated with the one or more second RACH-ConfigCommons of the selected uplink and performing a random access procedure based on the selected second RACH-ConfigCommon.

5 Claims, 12 Drawing Sheets

(51) Int. Cl.
*H04W 76/00* (2018.01)
*H04W 88/08* (2009.01)
(58) Field of Classification Search
USPC .......................................................... 370/329
See application file for complete search history.

(56) References Cited

FOREIGN PATENT DOCUMENTS

| KR | 10-2021-0125868 | 10/2021 |
|---|---|---|
| KR | 10-2021-0154740 | 12/2021 |
| KR | 10-2022-0000936 A | 1/2022 |

OTHER PUBLICATIONS

3GPP TS 38.331 V16.7.0 (Dec. 2021); Technical Specification; 3rd Generation Partnership Project; Technical Specification Group Radio Access Network; NR; Radio Resource Control (RRC) protocol specification (Release 16).
3GPP TS 38.321 V16.7.0 (Dec. 2021); Technical Specification; 3rd Generation Partnership Project; Technical Specification Group Radio Access Network; NR; Medium Access Control (MAC) protocol specification (Release 16).
3GPP TS 38.300 V16.8.0 (Dec. 2021); Technical Specification; 3rd Generation Partnership Project; Technical Specification Group Radio Access Network; Nr; NR and NG-RAN Overall Description; Stage 2 (Release 16).
3GPP TS 38.306 V16.7.0 (Dec. 2021); Technical Specification; 3rd Generation Partnership Project; Technical Specification Group Radio Access Network; NR; User Equipment (UE) radio access capabilities (Release 16).
3GPP TS 38.211 V17.0.0 (Dec. 2021); Technical Specification; 3rd Generation Partnership Project; Technical Specification Group Radio Access Network; NR; Physical channels and modulation (Release 17).
3GPP TS 38.212 V17.0.0 (Dec. 2021); Technical Specification; 3rd Generation Partnership Project; Technical Specification Group Radio Access Network; NR; Multiplexing and channel coding (Release 17).
3GPP TS 38.213 V17.0.0 (Dec. 2021); Technical Specification; 3rd Generation Partnership Project; Technical Specification Group Radio Access Network; NR; Physical layer procedures for control (Release 17).
3GPP TS 38.214 V17.0.0 (Dec. 2021); Technical Specification; 3rd Generation Partnership Project; Technical Specification Group Radio Access Network; NR; Physical layer procedures for data (Release 17).
Qualcomm Incorporated, "Selection and fallback among RACH partitions," 3GPP TSG-RAN WG2 Meeting #116bis-e, Online, R2-2200193, Jan. 17-25, 2022.
Samsung, "RA Procedure Aspects," 3GPP TSG-RAN2 Meeting #116bis Electronic, R2-2200207, Jan. 17-25, 2022.
Huawei et al., "MAC aspects for RACH partitioning," 3GPP TSG-RAN2 Meeting #116bis-e, Online, R2-2200813, Jan. 17-25, 2022.
InterDigital, "RACH indication and partitioning," 3GPP RAN WG2 Meeting #116-bis-e, eMeeting, R2-2201025, Jan. 17-25, 2022.
Email discussion Rapporteur (ZTE Corporation), "Updated-[Post116-e][515][RACH partitioning] MAC Procedure aspects (Zte)," 3GPP TSG-RAN2 Meeting #116bis-e, e-Meeting, R2-2201026, Jan. 17-26, 2022.
ZTE Corporation et al, "User plane aspects of RACH partitioning," 3GPP TSG-RAN2#116b-e, Electronic meeting, R2-2201031, Jan. 17-26, 2022.
Email discussion Rapporteur (Ericsson), "[Post116-e][514][RACH partitioning] Signaling design (Ericsson)," 3GPP TSG-RAN2 Meeting #116e-bis, e-Meeting, R2-2200020, Aug. 16-27, 2021.
Samsung, "Preamble and RACH resource configuration," 3GPP TSG-RAN2 Meeting #116bis Electronic, R2-2200206, Jan. 17-25, 2022.
Intel Corporation, "Signalling design of RACH partitioning for multiple feature combinations," 3GPP TSG RAN WG2 Meeting #116bis-e, E-Meeting, R2-2200456, Jan. 17-25, 2022.
Huawei et al., "Common signalling for RACH indication and partitioning," 3GPP TSG RAN WG2 #116bis-e, Electronic Meeting, R2-2200812, Jan. 17-25, 2022.
Nokia et al., "Features Combinations signalling," 3GPP TSG-RAN WG2 Meeting #116bis-e Electronic, Online, R2-2201049(R2-2110713), Jan. 17-25, 2022.
LG Electronics, "Discussion on signalling aspects on common RACH framework," 3GPP TSG-RAN WG2 Meeting #116bis electronic, Online, R2-2201473, Jan. 17-25, 2022.
Ericsson, "RACH partitioning for Rel-17 features," 3GPP TSG-RAN WG2 #116bis, Electronic meeting, Tdoc R2-2201553, 17th-25th, 2022.
Ericsson, "Running CR to 38.331 on RA Partitioning," 3GPP TSG-RAN WG2 Meeting #116bis-e, Electronic, R2-2202045, Jan. 17-25, 2022.
Qualcomm Incorporated, "Further discussion on slice specific RACH," 3GPP TSG RAN WG2 Meeting #114-e, E- Conference, R2-2104741, May 19-27, 2021.
Ericsson(Rapporteur), "Report of [Post115-e][504][RACH Partitioning] Signalling Aspects (Ericsson)," 3GPP TSG-RAN WG2 #116e, Electronic meeting, Tdoc R2-2110270, Nov. 1-12, 2021.
ETSI MCC, "Report of 3GPP TSG RAN WG2 meeting #114-e, Online," 3GPP TSG-RAN WG2 meeting #115-e, R2-2106901.
International Search Report for International Patent Application No. PCT/KR2023/001710, dated May 4, 2023.

* cited by examiner

```
BWP-UplinkCommon (1G-03)
    rach-ConfigCommon
    pusch-ConfigCommon
    pucch-ConfigCommon
    n * additionalRach-ConfigCommon
```

```
AdditionalRACH-ConfigCommon (1G-05)
    AdditionalRACH-ConfigIndex,
    rach-ConfigCommon
```

```
rach-ConfigCommon (1G-07)
    totalNumberOfRA-Preambles
    ra-Msg3SizeGroupA
    messagePowerOffsetGroupB
    numberOfRA-PreamblesGroupA
    rsrp-ThresholdSSB
    ra-ResponseWindow
    ra-ContentionResolutionTimer
    preambleReceivedTargetPower
    powerRampingStep
    m * featureCombinationParameter
```

```
featureCombinationParameter (1G-09)
    featureCombination
    startPreambleForThisPartition
    nrofPreamblesForThisPartition
    numberOfRA-PreamblesGroupA
    rsrp-threshold1
    rsrp-threshold2
    ra-Msg3SizeGroupA
    messagePowerOffsetGroupB
    msg3-DeltaPreamble
    powerRampingStep
    rsrp-ThresholdSSB
    preambleReceivedTargetPower
    preambleTransMax
```

FIG.1G

METHOD AND APPARATUS FOR RANDOM ACCESS IN WIRELESS MOBILE COMMUNICATION SYSTEM

CROSS-REFERENCE TO RELATED APPLICATION

This application is a continuation of International Application No. PCT/KR2023/001710, filed on Feb. 7, 2023, which claims priority to and the benefit of Korean Patent Application Nos. 10-2022-0015439, filed on Feb. 7, 2022, 10-2022-0015440, filed on Feb. 7, 2022, 10-2022-0015441, filed on Feb. 7, 2022, 10-2022-0015442, filed on Feb. 7, 2022, 10-2022-0015443, filed on Feb. 7, 2022, 10-2022-0015444, filed on Feb. 7, 2022, and 10-2022-0015445, filed on Feb. 7, 2022. Each of the above documents is incorporated herein by reference in its entirety.

BACKGROUND

Technical Field

The present disclosure relates to selecting a random access configuration from a plurality of random access configurations based on target feature combination in wireless communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and a plurality of distributed units for better scalability. To facilitate introduction of various services, 5G communication system targets supporting higher data rate and smaller latency.

In the 5G communication system, various feature combinations may be provided in one cell. The network may divide and provide RACH resources for each feature combination in order to achieve load balancing or the like. A means for efficiently providing RACH resource partitioning information for each combination of various features is required.

SUMMARY

Aspects of the present disclosure are to address problems of RACH resource partitioning. The method includes receiving SIB1 from the base station, determining an uplink for a random access procedure based on rsrpThresholdSSB-SUL, determining a first target feature combination, determining that the CE is applicable based on rsrp-ThresholdSSB-CE, determining a second target feature combination by adding CE in the first target feature combination, selecting a second RACH-ConfigCommon based on the comparison between the target feature combination and the one or more feature combinations associated with the one or more second RACH-ConfigCommons of the selected uplink and performing a random access procedure based on the selected second RACH-ConfigCommon.

BRIEF DESCRIPTION OF THE DRAWINGS

FIG. 1G is a diagram illustrating alternative structure of serving cell configuration information in system information of downlink control message.

DETAILED DESCRIPTION

Figure 1A:
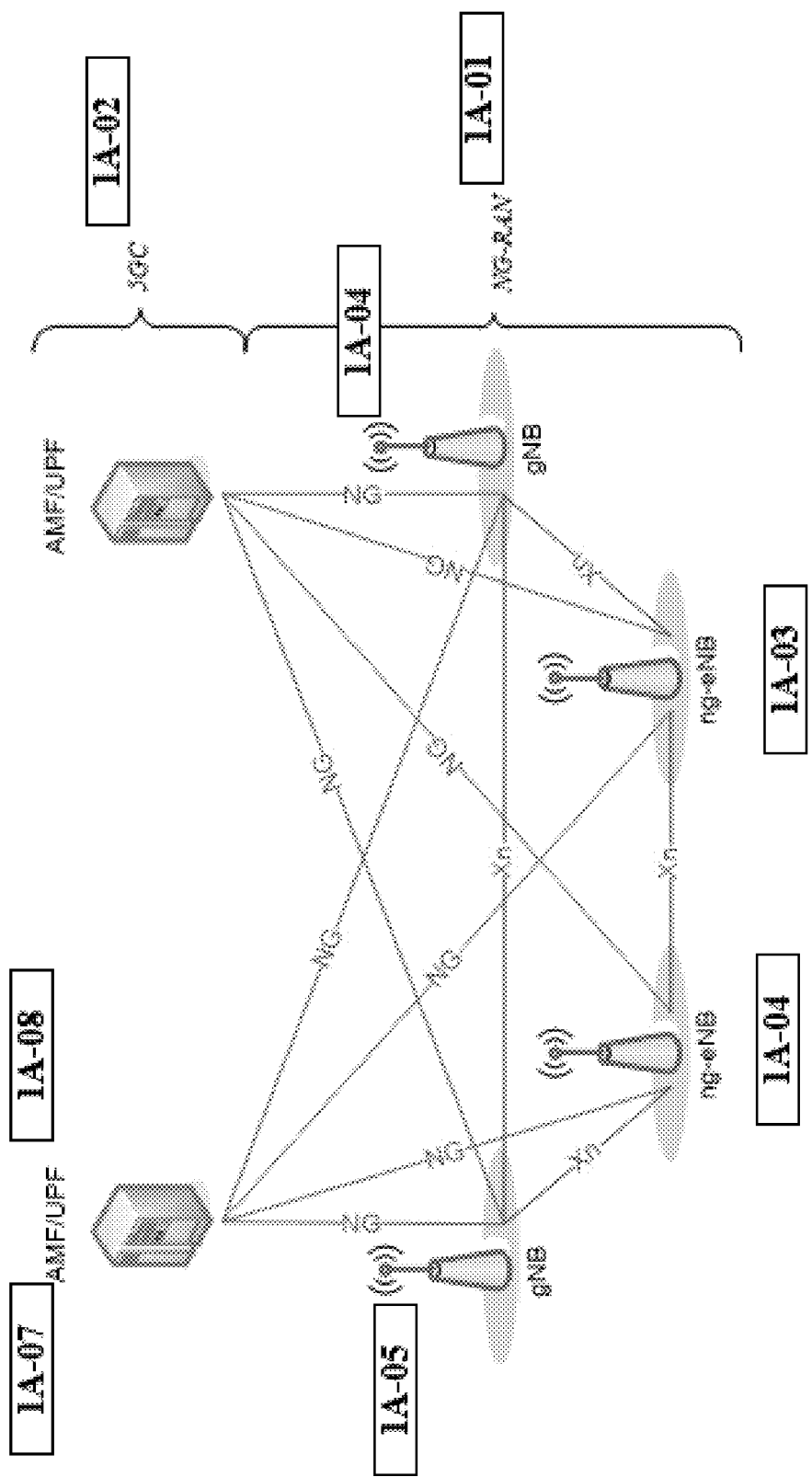
FIG. 1A is a diagram illustrating the architecture of an 5G system and a NG-RAN to which the disclosure may be applied.

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure,

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell |
| NG-RAN | NG Radio Access Network | SRB | Signalling Radio Bearer |
| NR | NR Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CRP | Cell Reselection Priority |
| PLMN | Public Land Mobile Network | | |
| PRACH | Physical Random Access Channel | | |
| PRB | Physical Resource Block | | |
| PSS | Primary Synchronisation Signal | | |
| PUCCH | Physical Uplink Control Channel | | |
| PUSCH | Physical Uplink Shared Channel | | |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |

TABLE 2-continued

| Terminology | Definition |
| --- | --- |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |

TABLE 2-continued

| Terminology | Definition |
| --- | --- |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB 1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters configured except for:<br>parameters within Reconfiguration WithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present disclosure, "trigger" or "triggered" and "initiate" or "initiated" may be used in the same meaning.

In the present disclosure, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
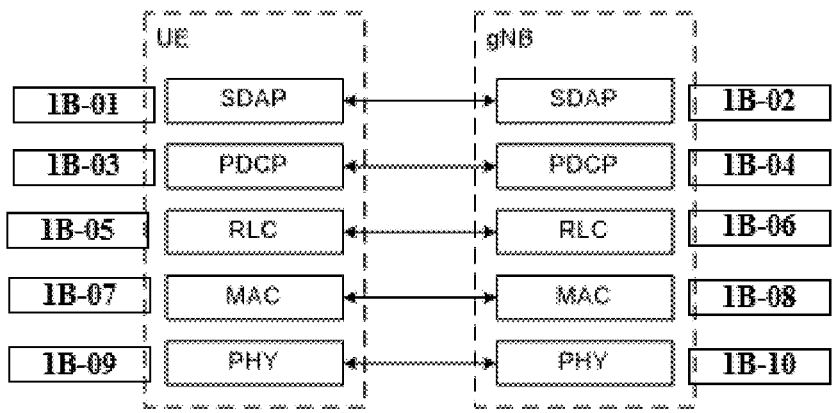
FIG. 1B is a diagram illustrating a wireless protocol architecture in an 5G system to which the disclosure may be applied.
Figure 1B:
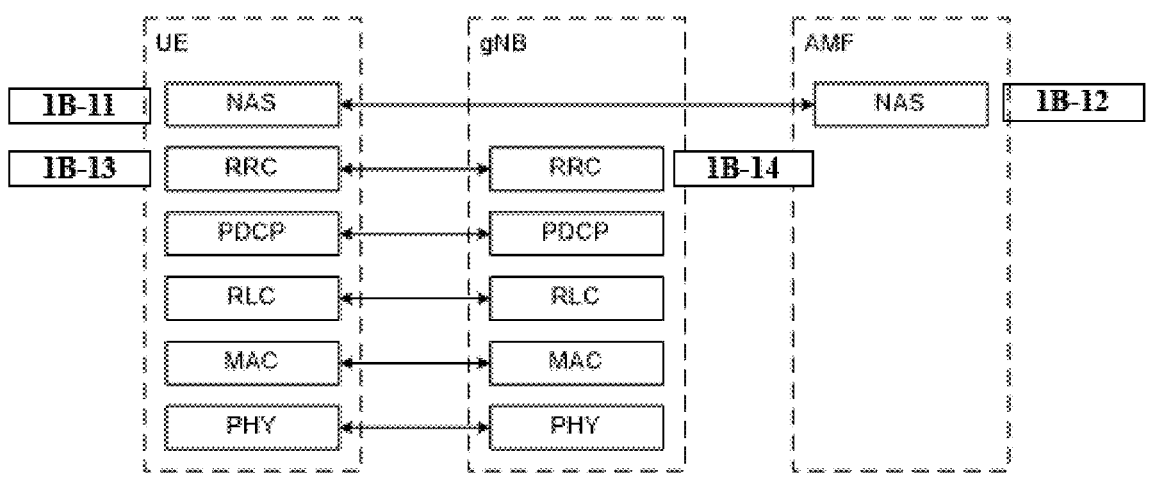

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

A reduced capability UE or RedCap UE has lower performance than a general UE and is used in limited scenarios such as IOT. Compared to a typical terminal having a bandwidth of 100 MHz, a transmission/reception speed of several Gbps, and four or more Rx processing units (Rx branches), RedCap terminals have a bandwidth of 20 MHz, a transmission/reception speed of several tens of Mbps, and two or less Rx processing units.

The present disclosure provides a method and apparatus for a RedCap UE to access a cell supporting RedCap, receive system information, and perform necessary operations. In particular, the terminal applies search space 0 (Search Space 0, hereinafter SS #0) and control resource set 0 (Control Resource Set 0, hereinafter CORESET #0) in the initial bandwidth part (IBWP) to obtain system information.

Figure 1C:
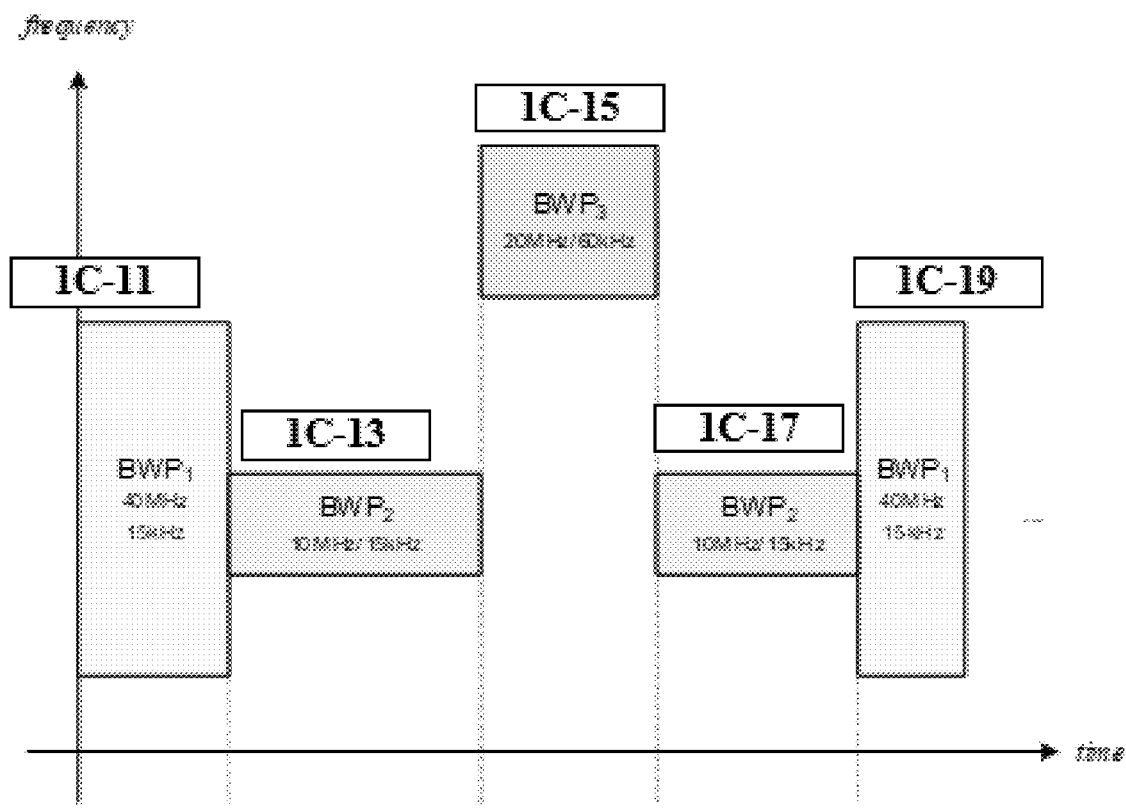
FIG. 1C is a diagram illustrating an example of a bandwidth part.

FIG. 1C is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1C describes a scenario where 3 different BWPs are configured:
BWP1 with a width of 40 MHz and subcarrier spacing of 15 kHz; 1C-11 or 1C-19
BWP2 with a width of 10 MHz and subcarrier spacing of 15 kHz; 1C-13 or 1C-17
BWP3 with a width of 20 MHz and subcarrier spacing of 60 kHz. 1C-15

Figure 1D:
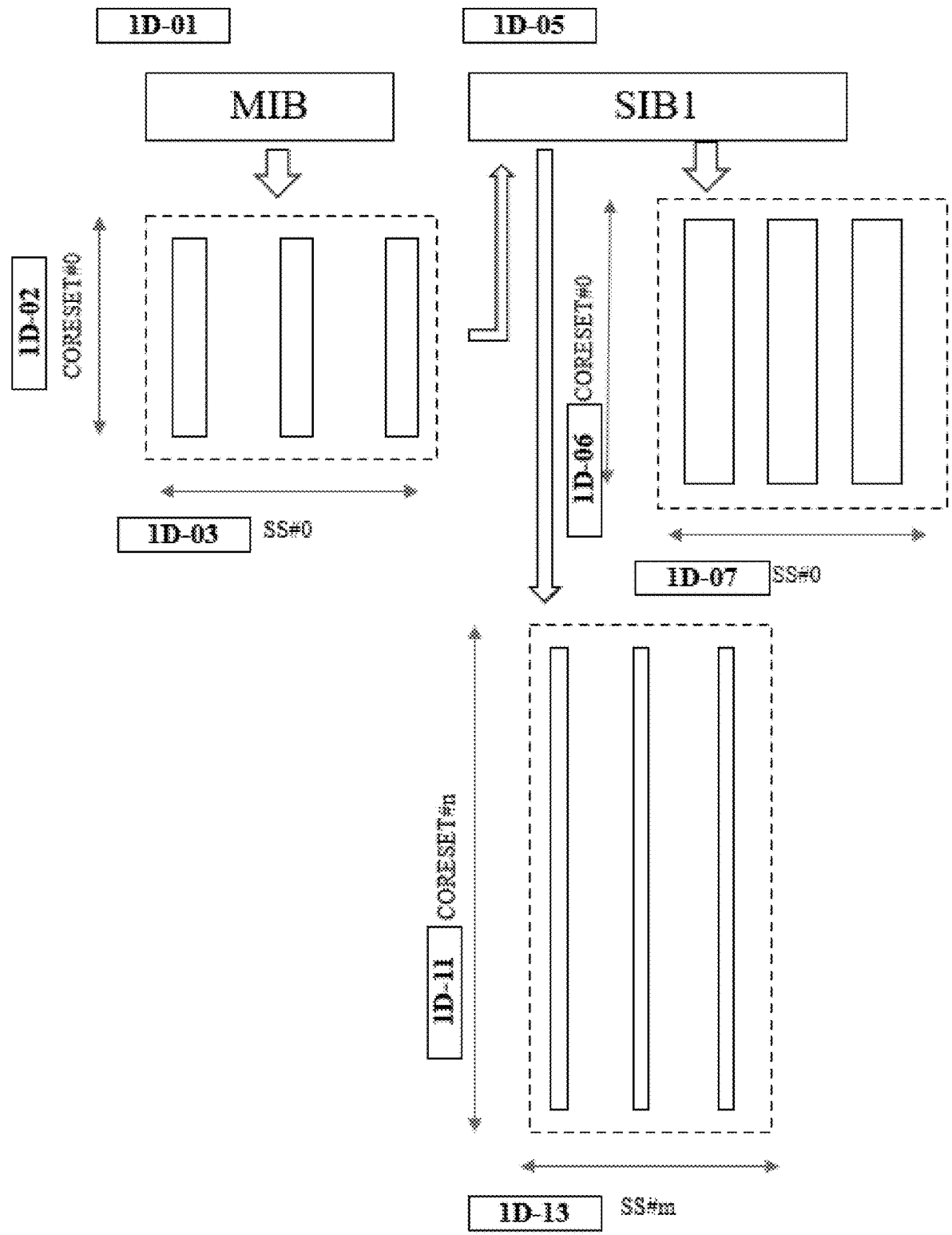
FIG. 1D is a diagram illustrating an example of a search space and a control resource set.

FIG. 1D is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1D-01, the UE recognizes CORESET #0 1D-02 and SS #0 1D-03 for receiving SIB1 using predetermined information included in the MIB. The UE receives SIB1 1D-05 through CORESET #0 1D-02 and SS #0 1D-03. In SIB1, information constituting CORESET #0 1D-06 and SS #0 1D-07 and information constituting another CORESET, for example, CORESET #n 1D-1I and SS #m 1D-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1D-02 configured in MIB and CORESET #0 1D-06 configured in SIB1 may be different from each other, and the former is called a first CORESET #0 and the latter is called a second CORESET #0. SS #0 1D-03 configured in MIB and SS #0 1D-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with a plurality of DL BWPs and a plurality of UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

tdd-UL-DL-ConfigurationCommon is cell specific TDD UL/DL configuration. It consists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

dl-UL-TransmissionPeriodicity indicates the period of the DL-UL pattern.

nrofDownlinkSlots indicates the number of consecutive full DL slots in each DL-UL pattern.

nrofDownlinkSymbols indicates the number of consecutive DL symbols from the beginning of the slot following the last full DL slot.

nrofUplinkSlots indicates the number of consecutive full UL slots in each DL-UL pattern.

nrofUplinkSymbols indicates the number of consecutive UL symbols at the last time point of a slot preceding the first full UL slot.

slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes a plurality of BWP-Downlink and a plurality of BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes Type2GapStatus. Type2GapStatus IE is enumerated with a single value of "deactivated". Alternatively, Type2GapStatus IE is enumerated with a single value of "activated". Alternatively, Type2GapStatus IE is enumerated with two values of "deactivated" and "activated". Alternatively, Type2GapStatus IE includes an DL BWP-Id.

Figure 1E:
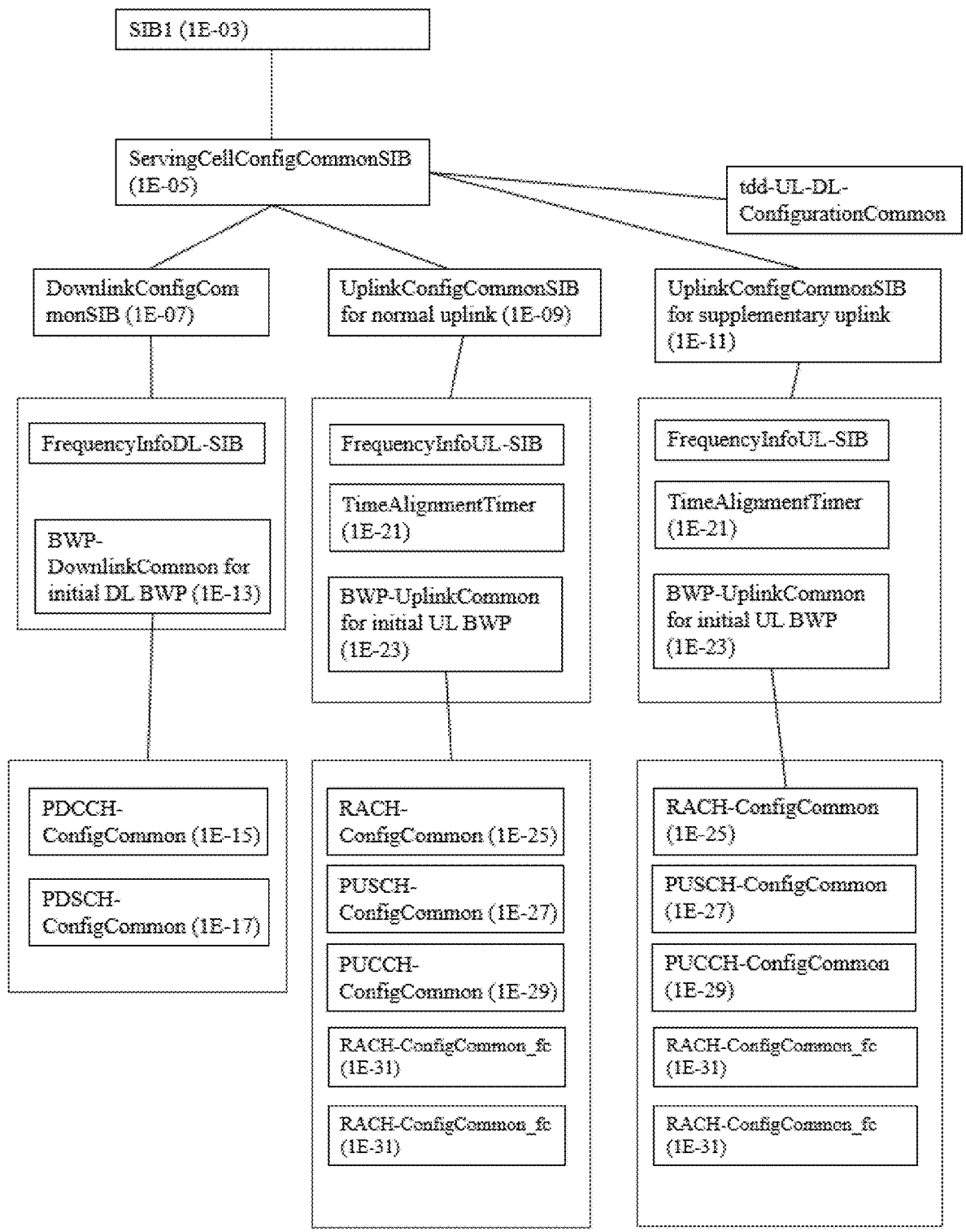
FIG. 1E is a diagram illustrating a structure of serving cell configuration information in system information.
Figure 1F:
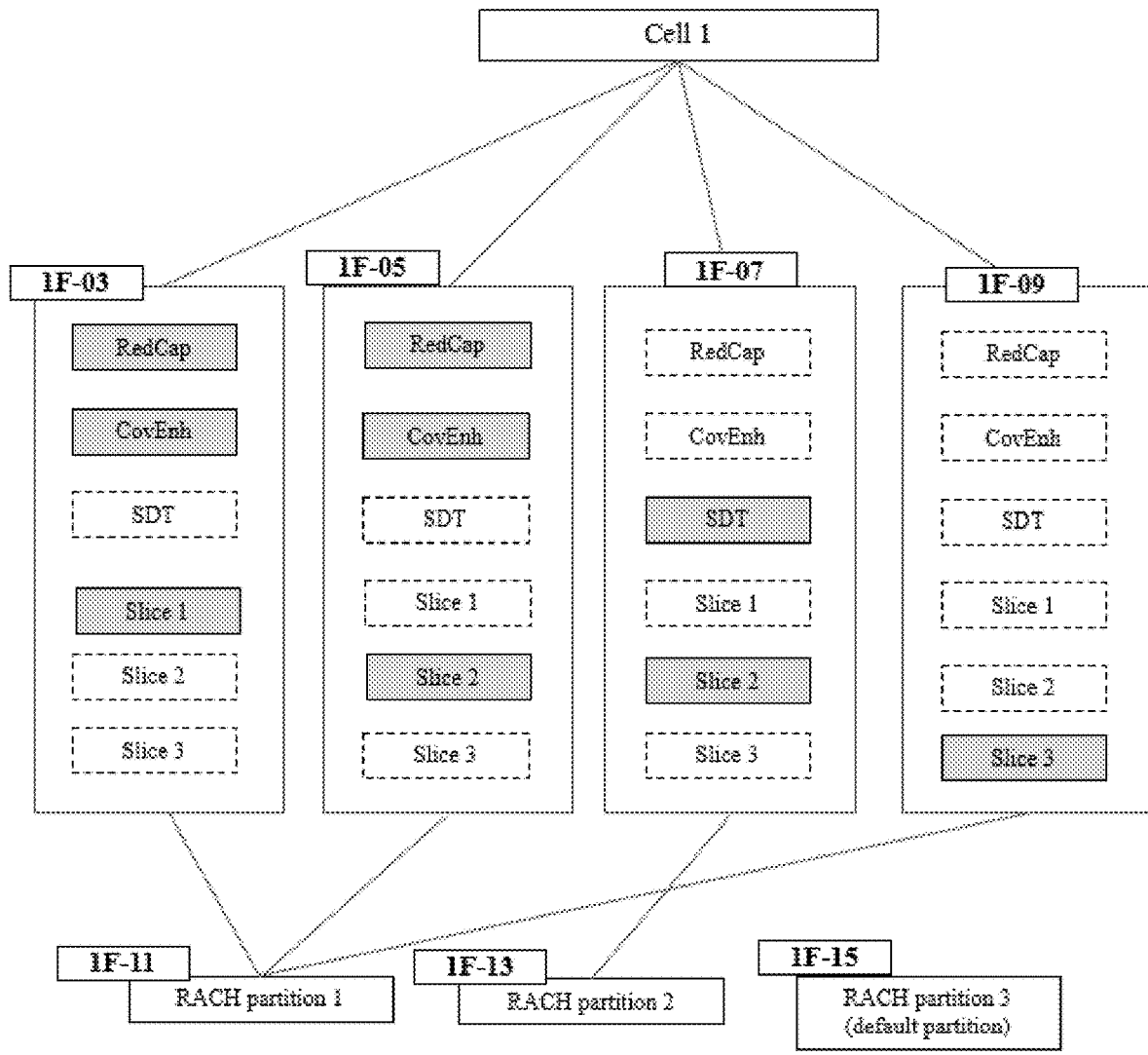
FIG. 1F is a diagram illustrating feature combinations supported in a cell.

The BWP-UplinkDedicated is used to configure the dedicated (UE specific) parameters of an uplink BWP.

firstActiveDownlinkBWP-Id contains the ID of the DL BWP to be activated upon performing the RRC (re-)configuration.

defaultDownlinkBWP-Id is the ID of the downlink bandwidth part to be used upon expiry of the BWP inactivity timer.

bwp-InactivityTimer is the duration in ms after which the UE falls back to the default Bandwidth Part FIG. 1e is a diagram illustrating the structure of ServingCellConfigCommonSIB included in the SIB1.

SIB1 (1E-03) includes ServingCellConfigCommonSIB (1E-05). ServingCellConfigCommonSIB includes one DownlinkConfigCommonSIB (1E-07) and two UplinkConfigCommonSIBs. One UplinkConfigCommonSIB (1E-09) is for a NUL (normal uplink) and the other UplinkConfigCommonSIB (1E-11) is for a SUL (supplementary uplink). UplinkConfigCommonSIB (1E-11) is for a SUL is located after UplinkConfigCommonSIB (1E-09) is for a NUL.

DownlinkConfigCommonSIB includes FrequencyInfoDL-SIB and BWP-DownlinkCommon (1E-13). BWP-DownlinkCommon is for the initial DL BWP and includes PDCCH-ConfigCommon (1E-15) and PDSCH-ConfigCommon (1E-17).

UplinkConfigCommonSIB includes FrequencyInfoUL-SIB and TimeAlignmentTimer (1E-21) and BWP-UplinkCommon (1E-23). BWP-UplinkCommon is for the initial UL BWP. BWP-UplinkCommon includes RACH-Config-Common (1E-25) and PUSCH-ConfigCommon (1E-27) and PUCCH-ConfigCommon (1E-29) and a plurality of RACH-ConfigCommon_fc (1E-31).

DownlinkConfigCommonSIB is a common downlink configuration of the serving cell. It consists of subfields such as FrequencyInfoDL-SIB and BWP-DownlinkCommon.

FrequencyInfoDL-SIB is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon. The first IBWP has a frequency domain corresponding to the first CORESET #0 of the MIB and has subcarrier spacing indicated by the MIB. The first IBWP is the IBWP indicated by the MIB and receiving SIB1, the second IBWP is the IBWP indicated by the SIB1 and receiving the SIB2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

PDCCH-ConfigCommon is the cell-specific PDCCH parameters of the BWP. It consists of subfields such as controlResourceSetZero, commonControlResourceSet, searchSpaceZero, commonSearchSpaceList, searchSpaceOtherSystemInformation, pagingSearchSpace, and ra-SearchSpace.

controlResourceSetZero is defined as an integer between 0 and 15. It indicates one of the predefined CORESET #0 configurations. The controlResourceSetZero included in the MIB corresponds to the first CORESET #0, and the controlResourceSetZero included in the PDCCH-ConfigCommon of the servingCellConfigCommon of SIB1 corresponds to the second CORESET #0.

searchSpaceZero is defined as an integer between 0 and 15. It indicates one of the predefined SS #0 configurations. The searchSpaceZero included in the MIB corresponds to the first SS #0, and the controlResourceSetZero included in the PDCCH-ConfigCommon of the servingCellConfigCommon of SIB1 corresponds to the second SS #0.

commonControlResourceSet is a common CORESET defined by ControlResourceSet IE. It defines an additional CORESET that can be used for paging reception, random access response reception, system information reception, etc.

commonSearchSpaceList is a list of common SSs. The common SS may be used for paging reception, random access response reception, system information reception, and the like.

searchSpaceOtherSystemInformation is defined by the SS identifier IE. If it is 0, the second SS #0 is indicated, and if it is a value other than 0, one of the SSs defined in commonSearchSpaceList is indicated.

pagingSearchSpace is defined by the SS identifier IE. If it is 0, the second SS #0 is indicated, and if it is a value other than 0, one of the SSs defined in commonSearchSpaceList is indicated.

ra-SearchSpace is defined by the SS identifier IE. If it is 0, the second SS #0 is indicated. If it is a value other than 0, one of the SSs defined in the commonSearchSpaceList is indicated.

PDSCH-ConfigCommon is cell-specific PDSCH parameters of this BWP. It consists of a pdsch-TimeDomainAllocationList. The pdsch-TimeDomainAllocationList is a list composed of a plurality of pdsch-TimeDomainAllocations.

pdsch-Pusch-TimeDomainAllocation is a time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination.

pcch-Config is configuration related to paging. It consists of sub-fields such as the base station paging period, PF-related parameters, and PO-related parameters.

bcch-config is a configuration related to system information. It consists of subfields such as modificationPeriodCoeff indicating the length of the modification period.

UplinkConfigCommonSIB is a common uplink configuration of the serving cell. It consists of subfields such as frequencyInfoUL, initialUplinkBWP, and timeAlignmentTimerCommon.

FrequencyInfoUL-SIB is a basic parameter of the uplink carrier. It consists of subfields such as a frequency band list and carrier bandwidth for each SCS.

BWP-UplinkCommon is the configuration of the second uplink IBWP. It consists of subfields such as BWP, rach-ConfigCommon, pusch-ConfigCommon, and pucch-ConfigCommon.

rach-ConfigCommon is the cell-specific random access parameter of the BWP. It consists of subfields such as prach-ConfigurationIndex, msg1-FrequencyStart, preambleReceivedTargetPower, ra-ResponseWindow, preambleTransMax, msg1-SubcarrierSpacing, rsrp-ThresholdSSB, rsrp-ThresholdSSB-SUL and ra-ContentionResolutionTimer.

prach-ConfigurationIndex is a PRACH configuration index. One PRACH configuration corresponds to pattern information on a PRACH transmission opportunity in the time domain (information indicating in which symbol in which slot of which radio frame PRACH transmission is possible), a transmission format of a preamble, and the like.

msg1-FrequencyStart is the offset from PRB0 of the lowest PRACH transmission opportunity. It is information indicating a PRACH transmission resource in the frequency domain. PRB0 is the lowest frequency PRB among PRBs of the corresponding carrier.

preambleReceivedTargetPower is the target power level of the network receiving end. It is a parameter related to transmission power control during the random access procedure.

ra-ResponseWindow is the length of the random access response window expressed in the number of slots.

preambleTransMax is the maximum number of random access preamble transmissions msg1-SubcarrierSpacing is PRACH's SCS. It is commonly applied to general terminals and RedCap UEs.

rsrp-ThresholdSSB is SSB selection criteria. The UE performs random access by selecting a preamble corresponding to the selected SSB.

rsrp-ThresholdSSB_SUL is SUL selection criteria. The UE selects SUL carrier for random access procedure based at least in part on this threshold.

ra-ContentionResolutionTimer is the initial value of the contention resolution timer. Indicates the number of subframes.

pusch-ConfigCommon is cell-specific PUSCH parameters of this BWP. It consists of subfields like pusch-TimeDomainAllocationList. The pusch-TimeDomainAllocationList is a list composed of a plurality of pusch-TimeDomainAllocations.

pusch-Pusch-TimeDomainAllocation is a time domain relationship between the PDCCH and the PUSCH. It consists of subfields such as K2 and startSymbolAndLength. K2 is the slot offset between the DCI and the scheduled PUSCH. startSymbolAndLength is an index indicating a valid combination of start symbol and length.

pucch-ConfigCommon is the cell-specific PUCCH parameter of the BWP. It consists of subfields such as pucch-ResourceCommon and p0-norminal.

pucch-ResourceCommon is an index corresponding to a cell-specific PUCCH resource parameters. One index corresponds to a PUCCH format, a PUCCH time period, a PUCCH frequency period, a PUCCH code, and the like.

p0-norminal is a power offset applied during PUCCH transmission. Defined as an integer between −202 and 24 in increments of 2. The unit is dBm.

timeAlignmentTimerCommon is a timer applied when the UE performs random access for RRC connection establishment procedure and RRC connection re-establishment procedure. When the UE receives the RAR, it starts driving the timer, and stops driving the timer when contention fails.

tdd-UL-DL-ConfigurationCommon is cell specific TDD UL/DL configuration. It consists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

dl-UL-TransmissionPeriodicity indicates the period of the DL-UL pattern.

nrofDownlinkSlots indicates the number of consecutive full DL slots in each DL-UL pattern.

nrofDownlinkSymbols indicates the number of consecutive DL symbols from the beginning of the slot following the last full DL slot.

nrofUplinkSlots indicates the number of consecutive full UL slots in each DL-UL pattern.

nrofUplinkSymbols indicates the number of consecutive UL symbols at the last time point of a slot preceding the first full UL slot FIG. if illustrates example of feature combinations supported in a cell.

A single cell may support several features like RedCap, SDT, Coverage Enhancement and various slices.

Some of them can be used together by a UE. Network may want to partition RACH resources and related parameters per feature combination, to achieve load balancing and better performance. For example, if RACH resource is partitioned to RedCap, reduced capabilities can be indicated to the network in MSG1 so that the network can adapt subsequent transmissions. If RACH resource is partitioned to SDT, requesting larger MSG3 size is possible.

One problem is that the network may not provide all possible combinations due to lack of RACH resources. Another problem is that there could be considerable number of feature combinations supported in a single cell.

To address the problems, the disclosure provides methods and apparatus for providing UE to the relevant information on the RACH partitioning in an efficient way. Signaling load and processing load of the terminal are reduced by defining RACH-related parameters to be jointly applied to a plurality of feature combinations and parameters to be applied exclusively to one feature combination.

A network slice consists of a RAN part and a CN part. The support of network slicing relies on the principle that traffic for different slices is handled by different PDU sessions. Network can realize the different network slices by scheduling and also by providing different L1/L2 configurations.

Each network slice is uniquely identified by a S-NSSAI. NSSAI (Network Slice Selection Assistance Information) includes one or a list of S-NSSAIs (Single NSSAI) where a S-NSSAI is a combination of:

mandatory SST (Slice/Service Type) field, which identifies the slice type and consists of 8 bits (with range is 0-255);
  optional SD (Slice Differentiator) field, which differentiates among Slices with same SST field and consist of 24 bits.

The list includes at most 8 S-NSSAI(s).

The UE provides NSSAI (Network Slice Selection Assistance Information) for network slice selection in RRCSetupComplete, if it has been provided by NAS. While the network can support large number of slices (hundreds), the UE need not support more than 8 slices simultaneously.

Network Slicing is a concept to allow differentiated treatment depending on each customer requirements.

Feature combination and RACH partition are explained with an example. Network support a feature combination of RedCap and CovEnh (or MSG3 repetition or CE) and slice 1 (1F-03) and a feature combination of CovEnh and CovEnh and slice 2 (1F-05) and a feature combination of SDT and slice 2 (1F-07) and a feature combination of slice 3 (1F-09). Network provides three RACH partition. Network may map the first feature combination and the second feature combination with the RACH partition 1 (1F-11). Network may map the third feature combination with the RACH partition 2 (1F-13). Network may map the fourth feature combination with the RACH partition 3 (1F-15). One of the RACH partitions may be configured as a default RACH partition.

RACH triggered for the first feature combination or for the second feature combination uses RACH partition 1. RACH triggered for third feature combination uses RACH partition 2. RACH triggered for fourth feature combination uses RACH partition 3. RACH triggered for other feature combinations (or RACH triggered for SI request) uses the default RACH partition.

FIG. 1g is a diagram illustrating an alternative structure of BWP-UplinkCommon included either in the SIB1 or in a downlink RRC message.

BWP-UplinkCommon (1G-03) comprises following IEs: rach-ConfigCommon, pusch-ConfigCommon, pucch-ConfigCommon and zero or one or more than one additionalRach-ConfigCommon. The additionalRach-ConfigCommon is included in the extended part of the BWP-UplinkCommon. Other IEs are included in the non-extended part of the BWP-UplinkCommon. Extended part is placed after non-extended part.AdditionalRACH-ConfigCommon (1G-05) comprises an AdditionalRACH-ConfigIndex (or RACH-Id) and a rach-ConfigCommon.

The rach-ConfigCommon in the non-extended part of BWP-UplinkCommon is the first rach-ConfigCommon. The rach-ConfigCommon in the extended part of BWP-UplinkCommon(rach-ConfigCommon in the AdditionalRACH-ConfigCommon) is the second rach-ConfigCommon.

Legacy UE comprehends IEs in the non-extended part and does not comprehends IEs in the extended part.

rach-ConfigCommon (1G-07) comprises following IEs in the non-extended part: totalNumberOfRA-Preambles, ra-Msg3SizeGroupA, messagePowerOffsetGroupB, numberOfRA-PreamblesGroupA, rsrp-ThresholdSSB, ra-ResponseWindow, ra-ContentionResolutionTimer, preambleReceivedTargetPower etc.

rach-ConfigCommon (1G-07) further includes zero or one or more than one featureCombinationParameter (1G-09) in the extended part.

The featureCombinationParameter is optionally present in the first rach-ConfigCommon and mandatorily present in the second rach-ConfigCommon.

totalNumberOfRA-Preambles is total number of preambles used for contention based and contention free 4-step or 2-step random access in the RACH resources defined in RACH-ConfigCommon, excluding preambles used for other purposes (e.g. for SI request). This IE is optionally present in the first rach-ConfigCommon and absent in the second rach-ConfigCommon.

The totalNumberOfRA-Preambles is an integer between 1 and 63. If the totalNumberOfRA-Preambles is absent in the first rach-ConfigCommon, all 64 preambles are available for random access.

If the totalNumberOfRA-Preambles is absent in the second rach-ConfigCommon, the number of preambles available for RA is indicated in the featureCombinationParameter.

Following IEs (hereafter the first IE) in the non-extended part of a RACH-ConfigCommon are applied to a plurality of feature combinations (or RACH partitions) in the extended part of the RACH-ConfigCommon: msg1-SubcarrierSpacing, ra-ContentionResolutionTimer, prach-ConfigurationIndex, msg1-FDM, msg1-FrequencyStart, tdd-UL-DL-ConfigurationCommon.

Following IEs (hereafter the second IE) in the non-extended part of a RACH-ConfigCommon are not applied to the plurality of feature combinations (or RACH partitions) in the extended part of the RACH-ConfigCommon: ra-Msg3SizeGroupA, messagePowerOffsetGroupB, numberOfRA-PreamblesGroupA.

For each feature combination (or RACH partition), the second IE in the corresponding featureCombinationParameter is applied.

Following IEs (hereafter the third IE) in the non-extended part of a RACH-ConfigCommon are conditionally applied to the plurality of feature combinations (or RACH partitions) in the extended part of the RACH-ConfigCommon: rsrp-ThresholdSSB, preambleReceivedTargetPower, preambleTransMax, ra-ResponseWindow, ra-ContentionResolutionTimer.

If a third IE is included in a feature combination, the third IE in the feature combination is applied to the corresponding feature combination. If the third IE is not included in a feature combination, the third IE in the non-extended part is applied to the corresponding feature combination.

featureCombinationParameter (1G-09) includes following IEs: featureCombination, startPreambleForThisPartition, nrofPreamblesForThisPartition, numberOfRA-PreamblesGroupA, rsrp-threshold1, rsrp-threshold2, ra-Msg3SizeGroupA, messagePowerOffsetGroupB, rsrp-ThresholdSSB, preambleReceivedTargetPower, preambleTransMax etc.

startPreambleForThisPartition defines the first preamble associated with the Feature Combination. startPreambleForThisPartition is an integer between 1 and 64.

nrofPreamblesForThisPartition determines how many consecutive preambles are associated to the Feature Combination starting from the starting preamble(s). nrofPreamblesForThisPartition is an integer between 1 and 64. Both nrofPreamblesForThisPartition and totalNumberOfRA-Preambles indicate the number of preambles. The maximum number (i.e., 64) is implicitly indicated in totalNumberOfRA-Preambles and explicitly indicated in nrofPreamblesForThisPartition.

numberOfRA-PreamblesGroupA determines how many consecutive preambles are associated to Group A starting from the starting preamble(s). The remaining preambles associated to the Feature Combination are associated to Group B.

Regarding rsrp-threshold1, UE may use the preambles defined by this feature combination and RACH occasions defined by the corresponding RACH-ConfigCommon only if the RSRP of the downlink pathloss reference is lower than this threshold. If absent, the value is infinity.

Regarding rsrp-threshold2, UE may use the preambles defined by this feature combination and RACH occasions defined by the corresponding RACH-ConfigCommon only if the RSRP of the downlink pathloss reference is higher than this threshold. If absent, the value is minus infinity.

If both rsrp-threhold1 and rsrp-threshold2 are fulfilled, UE use the preambles defined by this feature combination and RACH occasions defined by the corresponding RACH-ConfigCommon.

Only one of rsrp-threshold1 and rsrp-threshold2 can be present in a featureCombinationParameter.

When both rsrp-threshold1 and rsrp-threshold2 are absent, UE can use the preambles defined by this feature combination and RACH occasions defined by the corresponding RACH-ConfigCommon regardless of RSRP of the downlink pathloss reference.

When rsrp-threshold1 is present and rsrp-threshold2 is absent, UE can use the preambles defined by this feature combination and RACH occasions defined by the corresponding RACH-ConfigCommon if the RSRP of the downlink pathloss reference is higher than rsrp-threshold1.

When rsrp-threshold1 is absent and rsrp-threshold2 is present, UE can use the preambles defined by this feature combination and RACH occasions defined by the corresponding RACH-ConfigCommon if the RSRP of the downlink pathloss reference is lower than rsrp-threshold2.

Figure 2A:
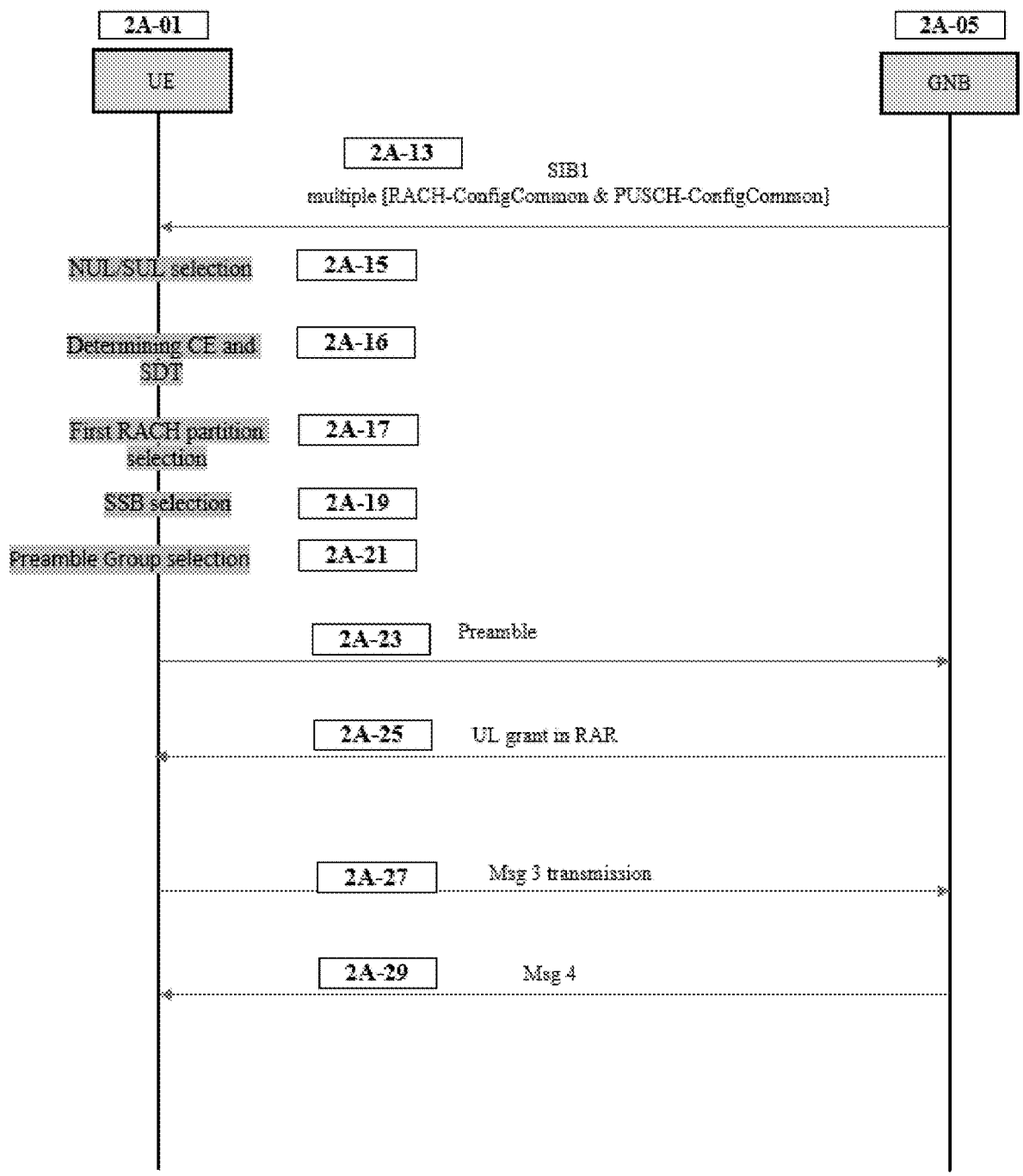
FIG. 2A is a diagram illustrating operations of a terminal and a base station according to an example of the present disclosure.

FIG. 2a illustrates the operations of UE in RRC_IDEL or in RRC_INACTIVE and GNB for random access procedure.

Random Access Preamble and preamble are used as same terminology.

When UE is switched on, UE performs cell selection and camps on a suitable cell.

In 2A-13, UE receives SIB1 in the suitable cell. GNB includes various information in the SIB1. SIB1 contains information relevant when evaluating if a UE is allowed to access a cell and defines the scheduling of other system information. It also contains radio resource configuration information that is common for all UEs. It also contains radio resource configuration information that is common for feature combinations.

Configuration information related to random access includes ra-SearchSpace, pdsch-TimeDomainAllocationList, rach-ConfigCommon, pucch-ResourceCommon, p0-norminal, tdd-UL-DL-ConfigurationCommon, and pusch-Pusch-TimeDomainAllocation.

ra-SearchSpace is included in PDCCH-ConfigCommon (1E-15). pdsch-TimeDomainAllocationList is included in PDSCH-ConfigCommon (1E-17). pucch-ResourceCommon and p0-norminal are included in PUCCH-ConfigCommon (1E-29). pusch-Pusch-TimeDomainAllocation is included in PUSCH-ConfigCommon (1E-27).

Random access related configuration information may be provided for each RACH partition (or feature combination) by one of two methods. In the first method, one IE, for example, RACH-ConfigCommon_fc is defined for each RACH partition (or feature combination), and all configuration information related to random access of the corresponding RACH partition (or feature combination) is included in the RACH-ConfigCommon_fc.

In the second method, one IE, for example, RACH-ConfigCommon_fc is defined for each RACH partition (or feature combination). Some of the configuration information related to random access of the corresponding RACH partition (or feature combination) is included in the RACH-ConfigCommon_fc and the rest is included in PDCCH-ConfigCommon (1E-15), PDSCH-ConfigCommon (1E-17), PUCCH-ConfigCommon (1E-29) and PUSCH-ConfigCommon (1E-27).

RACH-ConfigCommon_fc contains the following IEs: rach_ConfigCommon, rach-ConfigID, featureCombinationParameterList, prioritizedFeature rach-ConfigID is an identifier (or index) of this RACH partition configuration (or this additional RACH configuration).

featureCombinationList consists of one or more than one featureCombinations.

A featureCombination indicates the feature combinations for which this RACH configuration applies. The featureCombination IE includes redCap field and smallData field and covEnh field and slicing field. redCap field/smallData field/covEnh field is 1 bit enumerated with a single value of "true". If the corresponding field is present, it indicates that redCap UE/small data transmission/Coverage Enhancement is one of the features of this feature combination.

slicing field is a bitmap. The first bit of the bitmap corresponds to the first slice indicated in a specific field of a specific system information block. The second bit of the bitmap corresponds to the second slice indicated in the specific field of the specific system information block and so on. The specific field is the list of slice identifiers supported in this cell. The slice identifiers can be a S-NSSAI or a ST. The specific system information is either SIB1 or SIB2 or SIB3.

redCap field and smallData field and covEnh field and slicing field are optional fields.

Only one redCap field and only one smallData field and only one covEnh field and only one slicing field can be included in a featueCombination IE. A plurality of slices can be indicated by slicing field. redCap field and smallData field and covEnh field contains a single-value IE respectively. slicing field contains a multi-value IE/

Each slice of the plurality of slices indicated in a featureCombination produces effectively an additional feature combination. For example, if a featureCombination field includes slice field indicating slice x and slice y (bitmap with bit for slice x and bit for slice y set to 1 and other bits set to 0), two feature combination are effectively produced: one feature combination for slice x with the same single-value fields set to the same value as the original feature combination and another feature combination for slice y with the same single-value fields set to the same value as the original feature combination.

prioritizedFeature is the feature that is considered with priority when a target feature combination does not match none of feature combinations in the BWP of the selected uplink.

In a BWP-UplinkCommon (1E-23), a plurality of RACH-ConfigCommon can be included. The first RACH-ConfigCommon is placed in the first part of BWP-UplinkCommon. The first RACH-ConfigCommon is not associated with an explicit rach-ConfigID and is implicitly associated with a rach-ConfigID 0. The second RACH-ConfigCommon included in the RACH-ConfigCommon_fc is associated with an explicit rach-ConfigID. The second RACH-ConfigCommon associated with the explicit rach-ConfigID is placed in the second part of BWP-UplinkCommon. The second part is an extended part of the BWP-UplinkCommon. The second part is placed after the first part.

After receiving the information, UE initiates random access procedure. Random access procedure can be initiated to establish RRC connection.

Upon receiving the information, the UE applies the timeAlignmentTimerCommon received from SIB1 to the timeAlignmentTimer before starting transmission of a specific uplink RRC message.

The specific uplink RRC message could be RRCSetupRequest, RRCReestablishmentRequest or RRCResumeRequest. The UE in RRC_IDLE transmits an RRCSetupRequest message to establish an RRC connection. The UE in RRC_INACTIVE transmits an RRCResumeRequest message to resume the RRC connection. The UE in RRC_CONNECTED transmits an RRCReestablishmentRequest message to re-establish an RRC connection.

When the uplink RRC message transmission is initiated, a random access procedure is initiated.

In 2A-15, UE selects, based at least in part on rsrp-ThresholdSSB-SUL indicated in the first RACH-Config-Common for NUL, an uplink where random access procedure is to be performed.

If the RSRP of the downlink pathloss reference is less than rsrp-ThresholdSSB-SUL, UE select the NUL carrier for performing random access procedure.

If the RSRP of the downlink pathloss reference is greater than or equal to rsrp-ThresholdSSB-SUL, UE select the SUL carrier for performing random access procedure.

The downlink pathloss reference could be a SSB with the best RSRP among the SSBs of the cell. It could be any SSB of the cell.

UE could use, in selecting UL carrier, the rsrp-ThresholdSSB-SUL included in the first RACH-ConfigCommon of NUL. GNB may set the same values for the rsrp-ThresholdSSB-SULs included in the first RACH-ConfigCommon of SUL and the rsrp-ThresholdSSB-SUL included in the first RACH-ConfigCommon of NUL. GNB does not include rsrp-ThresholdSSB-SUL in the second RACH-ConfigCommon of NUL and in the second RACH-ConfigCommon of SUL.

Alternatively, the GNB sets the same value for all rsrp-ThresholdSSB-SULs included in UplinkConfigCommonSIB (1E-09) for NUL and all rsrp-ThresholdSSB-SULs included in UplinkConfigCommonSIB (1E-11) for SUL, The terminal may use any of these.

In 2A-16, the UE determines whether to use the Msg 3 repetition mode (CovEnh) or SDT (small data transmission). If rsrp-ThresholdSSB-CE is present in the first RACH-ConfigCommon of the selected uplink and the RSRP of the downlink path loss reference is lower than rsrp-ThresholdSSB-CE, the UE determines to use the Msg 3 repetition mode. If rsrp-ThresholdSSB-CE does not exist in the first RACH-ConfigCommon of the selected uplink or the RSRP of the downlink path loss reference is higher than rsrp-ThresholdSSB-CE, the UE determines not to use the Msg 3 repetition mode.

If rsrp-ThresholdSSB-SDT is present in the first RACH-ConfigCommon of the selected uplink and the RSRP of the downlink path loss reference is higher than rsrp-ThresholdSSB-SDT, and if SDT is triggered by upper layer, the UE determines to use SDT. If rsrp-ThresholdSSB-SDT does not exist in the first RACH-ConfigCommon of the selected uplink or the RSRP of the downlink path loss reference is lower than rsrp-ThresholdSSB-SDT, the UE determines not to use SDT.

GNB configure that rsrp-ThresholdSSB-SDT is higher than rsrp-ThresholdSSB-CE.

If it is decided to use the Msg 3 repetition mode, the UE includes CovEnh in the target feature combination for the corresponding RACH. For example, if the RedCap UE triggers the RACH and decides to use the Msg 3 repetition mode, the target feature combination is [RedCap AND CovEnh].

If it is decided to use the SDT, the UE includes CovEnh in the target feature combination for the corresponding RACH. For example, if UE triggers the RACH for slice x traffic and decides to use the SDT, the target feature combination is [SDT AND slice x].

In 2A-17, the UE selects a RACH partition (or RACH-ConfigCommon) in consideration of the target feature combination and the feature combination of the RACH partitions.

The target feature combination means the feature combination that triggered the RACH. For example, if random access for SDT is triggered in a RedCap terminal, the target feature combination is [RedCap AND SDT]. The UE performs RACH partition (or RACH-ConfigCommon) selection for feature combinations indicated in UplinkConfigCommonSIB of a specific BWP of the selected carrier.

For example, there are 3 RACH-ConfigCommon-fc, and each featureCombination is as follows: RACH-ConfigCommon-fc-1=[RedCap AND CovEnh AND Slice1 OR Slice2] =[RedCap AND CovEnh AND Slice1] OR [RedCap AND CovEnh AND Slice2], RACH-ConfigCommon-fc-2=[SDT AND Slice2], RACH-ConfigCommon-fc-3=[Slice3].

<How to Select RACH Partition (or RACH-ConfigCommon)>
1: Select candidate feature combinations that is a superset of the target feature combination. If all features of feature combination 1 are included in feature combination 2, then feature combination2 is a superset of feature combination1.
2: Select the closest feature combination to the target feature combination and the associated RACH partition among the candidate feature combinations
3: If there is no candidate feature combination (superset feature combination), select a feature combination in which at least one of the features of the target feature combination is a prioritized feature.
4: If there is no feature combination that matches the prioritized feature, default RACH-ConfigCommon is selected.

If the target feature combination is [RedCap AND Slice1], [RedCap AND CovEnh AND Slice1], the feature combination of RACH-ConfigCommon-fc-1, is a superset feature combination of the target feature combination, so the UE selects RACH-ConfigCommon-fc-1.

If the target feature combination is [RedCap AND SDT], then there is no superset feature combination. For example, if the prioritizedFeature of RACH-ConfigCommon-fc-2 is SDT, the UE may select RACH-ConfigCommon-fc-2.

the first RACH-ConfigCommon is the default RACH-ConfigCommon

Selecting a RACH-ConfigCommon-fc is selecting a feature combination associated with the RACH-ConfigCommon-fc In 2A-19, UE selects a SSB based at least in part on a rsrp-ThresholdSSB.

The UE uses the rsrp-ThresholdSSB of the selected RACH partition (or feature combination). For example, if the terminal selects the default RACH-ConfigCommon, the UE applies the rsrp-ThresholdSSB of the first RACH-ConfigCommon. If the UE selects the $n^{th}$ RACH-ConfigCommon-fc, the UE applies the rsrp-ThresholdSSB of the second RACH-ConfigCommon included in the $n^{th}$ RACH-ConfigCommon-fc.

In 2A-21, UE selects preamble group based at least in part on the selected RACH partition (or feature combination).

64 preambles are defined in total. They can be divided into two groups. UE having large data and being in a good channel condition can select Preamble Group B so that GNB can allocate bigger UL grant. UE having smaller data or being in a bad channel condition can select Preamble Group A so that GNB can allocate normal UL grant.

If the potential Msg3 size (UL data available for transmission plus MAC subheader(s) and, where required, MAC CEs) is greater than ra-Msg3SizeGroupA and the pathloss is less than PCMAX (of the Serving Cell performing the Random Access Procedure)—preambleReceivedTarget- Power—msg3-DeltaPreamble—messagePowerOffset-GroupB, UE select the Random Access Preamble group B.

If the Random Access procedure was initiated for the CCCH logical channel and the CCCH SDU size plus MAC subheader is greater than ra-Msg3SizeGroupA, UE selects the Random Access Preamble group B.

If the Random Access procedure was not initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was not initiated for the CCCH logical channel, and If the potential Msg3 size (UL data available for transmission plus MAC subheader(s) and, where required, MAC CEs) is greater than ra-Msg3SizeGroupA, and the pathloss is not less than PCMAX (of the Serving Cell performing the Random Access Procedure)-preambleReceivedTargetPower-msg3-DeltaPreamble-messagePowerOffsetGroupB, UE select the Random Access Preamble group A.

One msg3-DeltaPreamble may be included in the first part of PUSCH-ConfigCommon, and multiple msg3-DeltaPreambles may be included in the second part. msg3-DeltaPreamble of the second part is a parameter for featureCombination/RACH partition/second RACH-ConfigCommon. The second part is an expanded part and is located after the first portion.

Alternatively, RACH-ConfigCommon-fc may include msg3-DeltaPreamble to be applied to the corresponding featureCombination.

If the UE has selected the default RACH-ConfigCommon, the UE selects a random access preamble group using msg3-DeltaPreamble of PUSCH-ConfigCommon and Msg3SizeGroupA, preambleReceivedTargetPower and messagePowerOffsetGroupB of the first RACH-Config-Common. If msg3-DeltaPreamble is not included in PUSCH-ConfigCommon, the UE uses 0.

If the UE has selected the $n^{th}$ RACH-ConfigCommon-fc, the UE selects a random access preamble group using msg3-DeltaPreamble included in the $n^{th}$ RACH-Config-Common-fc and Msg3SizeGroupA, preambleReceivedTargetPower and messagePowerOffsetGroupB included in the second RACH-ConfigCommon included in the $n^{th}$ RACH-ConfigCommon-fc. If msg3-DeltaPreamble is not included in the $n^{th}$ RACH-ConfigCommon-fc, the UE uses 0.

If the UE selects the $n^{th}$ RACH-ConfigCommon-fc, the UE selects the $n^{th}$ msg3-DeltaPreamble of the second part of PUSCH-ConfigCommon and Msg3SizeGroupA, preambleReceivedTargetPower and messagePowerOffsetGroupB of the second RACH-ConfigCommon included in the $n^{th}$ RACH-ConfigCommon-fc to select a random access preamble group.

UE select a preamble randomly with equal probability from the preambles associated with the selected SSB from the selected preamble group. UE sets the PREAMBLE_INDEX to a ra-PreambleIndex corresponding to the selected preamble.

UE determines the next available PRACH occasion from the PRACH occasions corresponding to the selected SSB. UE shall select a PRACH occasion randomly with equal probability amongst the consecutive PRACH occasions indicated by PRACH configuration index of RACH-ConfigCommon of a specific BWP of the selected uplink. The specific BWP is initial uplink BWP.

In 2A-23, UE transmits the selected preamble in the selected PRACH occasion in the selected uplink.

UE sets PREAMBLE_RECEIVED_TARGET_POWER to preambleReceivedTargetPower+DELTA_PREAMBLE+(PREAMBLE_POWER_RAMPING_COUNTER−1)×powerRampingStep+POWER_OFFSET_2STEP_RA.

UE sets the transmission power of the preamble to the sum of PREAMBLE_RECEIVED_TARGET_POWER and the pathloss of DL pathloss reference.

If the UE selects the default RACH-ConfigCommon, the UE uses the preambleReceivedTargetPower and power-RampingStep of the first RACH-ConfigCommon. The UE sets POWER_OFFSET_2STEP_RA to 0. The UE sets DELTA_PREAMBLE according to the preamble format determined from the prach-ConfigurationIndex indicated in the first RACH-ConfigCommon. DELTA_PREAMBLE is predefined for each preamble format. PREAMBLE_POWER_RAMPING_COUNTER is initialized to 1 and increases by 1 for each preamble transmission.

If the UE selects the $n^{th}$ RACH-ConfigCommon-fc, the UE uses the preambleReceivedTargetPower and power-RampingStep of the second RACH-ConfigCommon of the $n^{th}$ RACH-ConfigCommon-fc. The UE sets POWER_OFFSET_2STEP_RA to 0. The UE sets DELTA_PREAMBLE according to the preamble format determined from the prach-ConfigurationIndex indicated in the second RACH-ConfigCommon. DELTA_PREAMBLE is predefined for each preamble format. PREAMBLE_POWER_RAMPING_COUNTER is initialized to 1 and increases by 1 for each preamble transmission.

In 2A-25, UE receives RAR including an uplink grant.

To receive RAR, UE start the ra-ResponseWindow configured by RACH-ConfigCommon at the first PDCCH occasion from the end of the Random Access Preamble transmission. UE monitors the PDCCH of the SpCell for Random Access Response(s) identified by the RA-RNTI while the ra-ResponseWindow is running.

In monitoring PDCCH, UE applies searchSpace indicated by ra-SearchSpace.

A set of PDCCH candidates for a UE to monitor is defined in terms of PDCCH search space sets. A search space set can be a CSS (Common Search Space) set or a USS (UE Search Space) set. A UE monitors PDCCH candidates in the search spaces set configured by a ra-SearchSpace in PDCCH-ConfigCommon or a ra-SearchSpace in a second RACH-configCommon.

One ra-SearchSpace may be included in the first part of PDCCH-ConfigCommon, and multiple ra-SearchSpaces may be included in the second part. The ra-SearchSpace of the second part is a parameter for featureCombination/RACH partition/second RACH-ConfigCommon. The second part is an extended part and is located after the first part.

Alternatively, RACH-ConfigCommon-fc may include ra-SearchSpace to be applied to the corresponding featureCombination.

If the UE selects the default RACH-ConfigCommon, the UE monitors the RA-RNTI by applying the ra-SearchSpace of the first part of the PDCCH-ConfigCommon.

If the UE selects the $n^{th}$ RACH-ConfigCommon-fc, the UE monitors the RA-RNTI by applying the ra-SearchSpace included in the $n^{th}$ RACH-ConfigCommon-fc.

If the UE selects the $n^{th}$ RACH-ConfigCommon-fc, the UE monitors the RA-RNTI by applying the $n^{th}$ ra-SearchSpace of the second part of the PDCCH-ConfigCommon.

UE consider Random Access Response reception is successful if the Random Access Response contains a MAC subPDU with Random Access Preamble identifier corresponding to the transmitted PREAMBLE_INDEX.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that the UE has to apply. The size of the Timing Advance Command field is 12 bits. The UE adjusts the uplink transmission timing based on the Timing Advance Command field and starts the timeAlignmentTimer. The timeAlignmentTimer is set to timeAlignmentTimerCommon, and the same timeAlignmentTimerCommon is applied to all feature combinations of an uplink. The Uplink Grant field indicates the resources to be used on the uplink. The size of the UL Grant field is 27 bits. The Temporary C-RNTI field indicates the temporary identity that is used by the UE during Random Access. The size of the Temporary C-RNTI field is 16 bits Uplink Grant field further includes PUSCH time resource allocation field. PUSCH time resource allocation field is 4 bit.

A single first Pusch-TimeDomainAllocationList may be included in the first part of PUSCH-ConfigCommon, and a plurality of second Pusch-TimeDomainAllocationLists may be included in the second part. The second Pusch-TimeDomainAllocationList of the second part is a parameter for featureCombination/RACH partition/second RACH-ConfigCommon. The second part is an extended part and is located after the first part.

Alternatively, RACH-ConfigCommon-fc may include a second Pusch-TimeDomainAllocationList to be applied to the corresponding featureCombination.

If the UE selects the default RACH-ConfigCommon, the UE determines the time domain relationship between the PDCCH and the PUSCH by using the first Pusch-TimeDomainAllocationList of the PUSCH-ConfigCommon.

If the UE selects the $n^{th}$ RACH-ConfigCommon-fc, the UE determines the time domain relationship between the PDCCH and the PUSCH by using the second Pusch-TimeDomainAllocationList included in the $n^{th}$ RACH-ConfigCommon-fc. If Pusch-TimeDomainAllocationList is not included in the $n^{th}$ RACH-ConfigCommon-fc, the UE uses first Pusch-TimeDomainAllocationList of the first part of PUSCH-ConfigCommon or default PUSCH time domain resource allocation table.

If the UE selects the $n^{th}$ RACH-ConfigCommon-fc, the UE determines the time domain relationship between the PDCCH and the PUSCH using the $n^{th}$ second Pusch-TimeDomainAllocationList of the second part of the PUSCH-ConfigCommon. If the $n^{th}$ second Pusch-TimeDomainAllocationList does not exist in the second part, the UE uses the Pusch-TimeDomainAllocationList of the first part of PUSCH-ConfigCommon or default PUSCH time domain resource allocation table.

PUSCH time resource allocation field indicates a pusch-TimeDomainResourceAllocation of a pusch-TimeDomainResourceAllocationList in PUSCH-ConfigCommon.

PUSCH time resource allocation field indicates an indexed row of a default PUSCH time domain resource allocation table illustrated in table x if PUSCH-ConfigCommon does not include the first pusch-TimeDomainResourceAllocationList.

TABLE 4

| Row index | $K_2$ | S | L |
| --- | --- | --- | --- |
| 1 | j | 0 | 14 |
| 2 | j | 0 | 12 |
| 3 | j | 0 | 10 |
| 4 | j | 2 | 10 |
| 5 | j | 4 | 10 |
| 6 | j | 4 | 8 |
| 7 | j | 4 | 6 |
| 8 | j + 1 | 0 | 14 |
| 9 | j + 1 | 0 | 12 |
| 10 | j + 1 | 0 | 10 |
| 11 | j + 2 | 0 | 14 |
| 12 | j + 2 | 0 | 12 |
| 13 | j + 2 | 0 | 10 |
| 14 | j | 8 | 6 |
| 15 | j + 3 | 0 | 14 |
| 16 | j + 3 | 0 | 10 | j is a value specific to the PUSCH subcarrier spacing and is defined in the table below.

| PUSCH subcarrier Spacing | j |
| --- | --- |
| 15 kHz | 1 |
| 30 kHz | 1 |
| 60 kHz | 2 |
| 120 kHz | 3 |

When the UE transmits a PUSCH scheduled by RAR, the delta value specific to the PUSCH subcarrier spacing is applied in addition to the $K_2$ value.

| PUSCH subcarrier Spacing | delta |
| --- | --- |
| 15 kHz | 2 |
| 30 kHz | 3 |
| 60 kHz | 4 |
| 120 kHz | 6 |

UE determines K2 based at least in part on h; the value indicated in PUSCH time resource allocation field.

If UE selected the default RACH-ConfigCommon and If PUSCH-ConfigCommon includes the first pusch-TimeDomainResourceAllocationList, h indicates $(h+1)^{th}$ entry of pusch-TimeDomainResourceAllocationList.

If UE selected $n^{th}$ RACH-ConfigCommon-fc and If PUSCH-ConfigCommon includes the $n^{th}$ second pusch-TimeDomainResourceAllocationList, h indicates $(h+1)^{th}$ entry of the $n^{th}$ second pusch-TimeDomainResourceAllocationList.

Or if UE selected $n^{th}$ RACH-ConfigCommon-fc and If $n^{th}$ RACH-ConfigCommon-fc includes a second pusch-TimeDomainResourceAllocationList, h indicates $(h+1)^{th}$ entry of the second pusch-TimeDomainResourceAllocationList.

Each entry of pusch-TimeDomainResourceAllocationList (or each pusch-TimeDomainResourceAllocation of pusch-TimeDomainResourceAllocationList) is associated with a k2. UE determines k2 for the PUSCH transmission by the k2 value associated with the pusch-TimeDomainResourceAllocation which is indicated by h.

If UE selected the default RACH-ConfigCommon and if PUSCH-ConfigCommon does not includes the first pusch-TimeDomainResourceAllocationList, h indicates row index (h+1) of the default PUSCH time domain resource allocation table.

If UE selected $n^{th}$ RACH-ConfigCommon-fc and If PUSCH-ConfigCommon does not includes the $n^{th}$ second pusch-TimeDomainResourceAllocationList, h indicates row index (h+1) of the default PUSCH time domain resource allocation table.

Or if UE selected $n^{th}$ RACH-ConfigCommon-fc and If $n^{th}$ RACH-ConfigCommon-fc does not includes the $n^{th}$ second pusch-TimeDomainResourceAllocationList, h indicates row index (h+1) of the default PUSCH time domain resource allocation table.

Each row of the default PUSCH time domain resource allocation table is associated with k2 which is a function of j.and i. UE determines j according to the PUSCH subcarrier spacing. UE determines i based at least in part on h. UE determines k2 by adding the determined j and determined i. In other words, UE determines k2 based at least in part on the j determined based at least in part on the PUSCH subcarrier spacing and the row index determined based at least in part on the h.

PUSCH subcarrier spacing is determined by a subcarrier spacing IE included in a BWP-UplinkCommon IE. If UE is in RRC_IDLE or RRC_INACTIVE, the BWP-UplinkCommon is indicated in SIB1 and is for the initial uplink BWP. If UE is in RRC_CONNECTED, the BWP-UplinkCommon is for the current active uplink BWP.

UE determines the time slot for PUSCH transmission scheduled by RAR. If a UE receives a PDSCH with a RAR message ending in slot n for a corresponding PRACH transmission from the UE, the UE transmits the PUSCH in slot (n+k2+delta). k2 and delta are subcarrier spacing specific and determined as below.

If pusch-TimeDomainResourceAllocationList is not included in PUSCH-ConfigCommon in ServingCellConfig-CommonSIB, k2 is determined based at least in part on h and j and i. j is determined based at least in part on subcarrier spacing IE included in BWP-UplinkCommon IE in ServingCellConfigCommonSIB. If subcarrier spacing IE indicates 15 kHz or 30 kHz, j is 1. If subcarrier spacing IE indicates 60 kHz, j is 2. If subcarrier spacing IE indicates 120 kHz, j is 3.

Delta is determined based at least in part on subcarrier spacing IE included in BWP-UplinkCommon IE in ServingCellConfigCommonSIB. If subcarrier spacing IE indicates 15 kHz, delta is 2. If subcarrier spacing IE indicates 30 kHz, delta is 3. If subcarrier spacing IE indicates 60 kHz, delta is 4. If subcarrier spacing IE indicates 120 kHz, delta is 6.

In 2A-27, the UE performs Msg 3 transmission at the determined slot according to the UL grant in the received RAR.

UE determines the PUSCH transmission power by summing offset, pathloss and other parameters related with number of PRBs and power control commands.

offset is sum of preambleReceivedTargetPower and msg3-DeltaPreamble.

One msg3-DeltaPreamble may be included in the first part of PUSCH-ConfigCommon, and multiple msg3-DeltaPreambles may be included in the second part. msg3-DeltaPreamble of the second part is a parameter for featureCombination/RACH partition/second RACH-ConfigCommon. The second part is an extended part and is located after the first part.

Alternatively, RACH-ConfigCommon-fc may include msg3-DeltaPreamble to be applied to the corresponding featureCombination.

If the UE selects the default RACH-ConfigCommon, the UE uses msg3-DeltaPreamble of PUSCH-ConfigCommon and preambleReceivedTargetPower of the first RACH-ConfigCommon.

If the UE selects the $n^{th}$ RACH-ConfigCommon-fc, the UE uses msg3-DeltaPreamble and preambleReceivedTargetPower included in the $n^{th}$ RACH-ConfigCommon-fc.

If the UE selects the $n^{th}$ RACH-ConfigCommon-fc, the UE uses the $n^{th}$ msg3-DeltaPreamble of the second part of the PUSCH-ConfigCommon and the preambleReceivedTargetPower included in the $n^{th}$ RACH-ConfigCommon-fc.

UE generates a Msg3. If SDT is applied, the Msg3 (or the MAC PDU scheduled by RAR) includes a RRC message and a DRB data. The RRC message is not ciphered and the DRB data is ciphered by the security key stored in UE AS context. The RRC message is included in the first MAC SDU and the DRB data is included in the second MAC SDU. The first MAC SDU and the second MAC SDU consists of MAC subheader and MAC payload. The MAC payload of the second MAC SDU contains the DRB data. The MAC subheader is not ciphered. The second MAC SDU is located after the first MAC SDU.

UE transmits the Msg3.UE starts contention-ResolutionTimer. The timer is set by the value indicated in the selected RACH-ConfigCommon of the selected uplink carrier.

GNB receives the Msg3 and process RRC message included in Msg 3. If RRC message requesting connection setup, GNB performs call admission control and act upon the result.

In steps 2A-29, the UE receives Msg 4 from the base station. Msg 4 includes a downlink RRC control message such as RRCSetup.

UE receives a DCI in PDCCH addressed by a temporary C-RNTI The DCI includes a Time domain resource assignment field. The temporary C-RNTI is assigned to the UE in the RAR To receives the DCI in PDCCH addressed by the temporary C-RNTI, UE applies searchSpace indicated by ra-SearchSpace. UE monitors PDCCH while the contention-ResolutionTimer is running.

If the UE selects the default RACH-ConfigCommon, the UE monitors the RA-RNTI by applying the ra-SearchSpace of the first part of the PDCCH-ConfigCommon.

If the UE selects the $n^{th}$ RACH-ConfigCommon-fc, the UE monitors the RA-RNTI by applying the ra-SearchSpace included in the $n^{th}$ RACH-ConfigCommon-fc.

If the UE selects the $n^{th}$ RACH-ConfigCommon-fc, the UE monitors the RA-RNTI by applying the $n^{th}$ ra-SearchSpace of the second part of the PDCCH-ConfigCommon.

A single first Pusch-TimeDomainAllocationList may be included in the first part of PUSCH-ConfigCommon, and a plurality of second Pusch-TimeDomainAllocationLists may be included in the second part. The second Pusch-TimeDomainAllocationList of the second part is a parameter for featureCombination/RACH partition/second RACH-ConfigCommon. The second part is an extended part and is located after the first part.

Alternatively, RACH-ConfigCommon-fc may include a second Pusch-TimeDomainAllocationList to be applied to the corresponding featureCombination.

If the UE selects the default RACH-ConfigCommon, the UE determines the time domain relationship between the PDCCH and the PUSCH by using the first Pusch-TimeDomainAllocationList of the PUSCH-ConfigCommon.

If the UE selects the $n^{th}$ RACH-ConfigCommon-fc, the UE determines the time domain relationship between the PDCCH and the PUSCH by using the second Pusch-TimeDomainAllocationList included in the $n^{th}$ RACH-ConfigCommon-fc. If Pusch-TimeDomainAllocationList is not included in the $n^{th}$ RACH-ConfigCommon-fc, the UE uses first Pusch-TimeDomainAllocationList of the first part of PUSCH-ConfigCommon or default PUSCH time domain resource allocation table.

A single first Pdsch-TimeDomainAllocationList may be included in the first part of PDSCH-ConfigCommon, and a plurality of second Pdsch-TimeDomainAllocationLists may be included in the second part. The second Pdsch-TimeDomainAllocationList of the second part is a parameter for featureCombination/RACH partition/second RACH-ConfigCommon. The second part is an extended part and is located after the first part.

Alternatively, RACH-ConfigCommon-fc may include a second Pdsch-TimeDomainAllocationList to be applied to the corresponding featureCombination.

If the UE selects the default RACH-ConfigCommon, the UE determines the time domain relationship between the PDCCH and the PDSCH by using the first Pdsch-TimeDomainAllocationList of the PDSCH-ConfigCommon.

If the UE selects the $n^{th}$ RACH-ConfigCommon-fc, the UE determines the time domain relationship between the PDCCH and the PDSCH by using the second Pdsch-TimeDomainAllocationList included in the $n^{th}$ RACH-ConfigCommon-fc. If Pdsch-TimeDomainAllocationList is not included in the $n^{th}$ RACH-ConfigCommon-fc, the UE uses first Pdsch-TimeDomainAllocationList of the first part of PDSCH-ConfigCommon or default PDSCH time domain resource allocation table.

If the UE selects the $n^{th}$ RACH-ConfigCommon-fc, the UE determines the time domain relationship between the PDCCH and the PDSCH using the $n^{th}$ second Pdsch-TimeDomainAllocationList of the second part of the PDSCH-ConfigCommon. If the $n^{th}$ second Pdsch-TimeDomainAllocationList does not exist in the second part, the UE uses the Pdsch-TimeDomainAllocationList of the first part of PDSCH-ConfigCommon or default PDSCH time domain resource allocation table.

PDSCH time resource allocation field indicates a pdsch-TimeDomainResourceAllocation of a pdsch-TimeDomainResourceAllocationList in PDSCH-ConfigCommon.

PDSCH time resource allocation field indicates an indexed row of a default PDSCH time domain resource allocation table illustrated in table x if PDSCH-ConfigCommon does not include the first pdsch-TimeDomainResourceAllocationList.

TABLE 5

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |

TABLE 5-continued

| Row index | dmrs-TypeA-Position | PDSCH mapping type | $K_0$ | S | L |
|---|---|---|---|---|---|
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

UE determines K0 and S and L based at least in part on h; the value indicated in time resource assignment field.

If UE selected the default RACH-ConfigCommon and If PDSCH-ConfigCommon includes the first pdsch-TimeDomainResourceAllocationList, h indicates $(h+1)^{th}$ entry of the first pdsch-TimeDomainResourceAllocationList.

If UE selected $n^{th}$ RACH-ConfigCommon-fc and If PDSCH-ConfigCommon includes the $n^{th}$ second pdsch-TimeDomainResourceAllocationList, h indicates $(h+1)^{th}$ entry of the $n^{th}$ second pdsch-TimeDomainResourceAllocationList.

Or if UE selected $n^{th}$ RACH-ConfigCommon-fc and If $n^{th}$ RACH-ConfigCommon-fc includes a second pdsch-TimeDomainResourceAllocationList, h indicates $(h+1)^{th}$ entry of the second pdsch-TimeDomainResourceAllocationList.

Each entry of pdsch-TimeDomainResourceAllocationList (or each pdsch-TimeDomainResourceAllocation of pdsch-TimeDomainResourceAllocationList) is associated with K0 and S and L. UE determines K0 and S and L for the PDSCH reception by the K0 and S and L associated with the pdsch-TimeDomainResourceAllocation which is indicated by h.

If UE selected the default RACH-ConfigCommon and if PDSCH-ConfigCommon does not includes the first pdsch-TimeDomainResourceAllocationList, h indicates row index (h+1) of the default PDSCH time domain resource allocation table.

If UE selected $n^{th}$ RACH-ConfigCommon-fc and If PDSCH-ConfigCommon does not includes the $n^{th}$ second pdsch-TimeDomainResourceAllocationList, h indicates row index (h+1) of the default PDSCH time domain resource allocation table.

Or if UE selected $n^{th}$ RACH-ConfigCommon-fc and If $n^{th}$ RACH-ConfigCommon-fc does not includes the $n^{th}$ second pdsch-TimeDomainResourceAllocationList, h indicates row index (h+1) of the default PDSCH time domain resource allocation table.

The UE determines a transmission resource for transmitting the HARQ ACK for Msg 4 based at least in part on one of a plurality of pucch-ResourceCommon.

A single first pucch-ResourceCommon may be included in the first part of PUCCH-ConfigCommon, and a plurality of second pucch-ResourceCommons may be included in the second part. The second pucch-ResourceCommon of the second part is a parameter for featureCombination/RACH partition/second RACH-ConfigCommon. The second part is an extended part and is located after the first part.

Alternatively, RACH-ConfigCommon-fc may include pucch-ResourceCommon to be applied to the corresponding featureCombination.

If the UE selects the default RACH-ConfigCommon, the UE uses the first pucch-ResourceCommon of the PUCCH-ConfigCommon.

If the UE selects the $n^{th}$ RACH-ConfigCommon-fc, the UE uses the pucch-ResourceCommon included in the $n^{th}$ RACH-ConfigCommon-fc. If there is no pucch-Resource-Common in the $n^{th}$ RACH-ConfigCommon-fc, the UE uses the first pucch-ResourceCommon of PUCCH-ConfigCommon.

Or if the UE selects the $n^{th}$ RACH-ConfigCommon-fc, the UE uses the $n^{th}$ second pucch-ResourceCommon of the second part of PUCCH-ConfigCommon.

The UE determines the nominal power offset to be applied to HARQ ACK transmission for Msg 4 based at least in part on one of a first nominal power offset (p0-normal) included in the first part of pucch-ConfigCommon and a plurality of second nominal power offset (p0-norminal) included in the second part of pucch-ConfigCommon or in a plurality of RACH-ConfigCommon-fc and a nominal power offset fixed to a predetermined value.

A single first nominal power offset may be included in the first part of PUCCH-ConfigCommon, and a plurality of second nominal power offset may be included in the second part. The second nominal power offset of the second part is a parameter for featureCombination/RACH partition/second RACH-ConfigCommon. The second part is an extended part and is located after the first part.

Alternatively, RACH-ConfigCommon-fc may include nominal power offset to be applied to the corresponding featureCombination.

If the UE selects the default RACH-ConfigCommon, the UE uses the first nominal power offset of the PUCCH-ConfigCommon. If the first nominal power offset is not included in the PUCCH-ConfigCommon, UE uses the fixed nominal power offset.

If the UE selects the $n^{th}$ RACH-ConfigCommon-fc, the UE uses the second nominal power offset included in the $n^{th}$ RACH-ConfigCommon-fc. If the second nominal power offset is not included in the $n^{th}$ RACH-ConfigCommon-fc, the UE uses the first nominal power offset of PUCCH-ConfigCommon.

Or if the UE selects the $n^{th}$ RACH-ConfigCommon-fc, the UE uses the $n^{th}$ second nominal power offset of the second part of PUCCH-ConfigCommon. If the $n^{th}$ second nominal power offset is not included in the PUCCH-ConfigCommon, the UE uses the first nominal power offset of PUCCH-ConfigCommon.

The UE and the base station that have transmitted and received the RRCRequest message and the RRCSetup message establish an RRC connection.

Figure 2B:
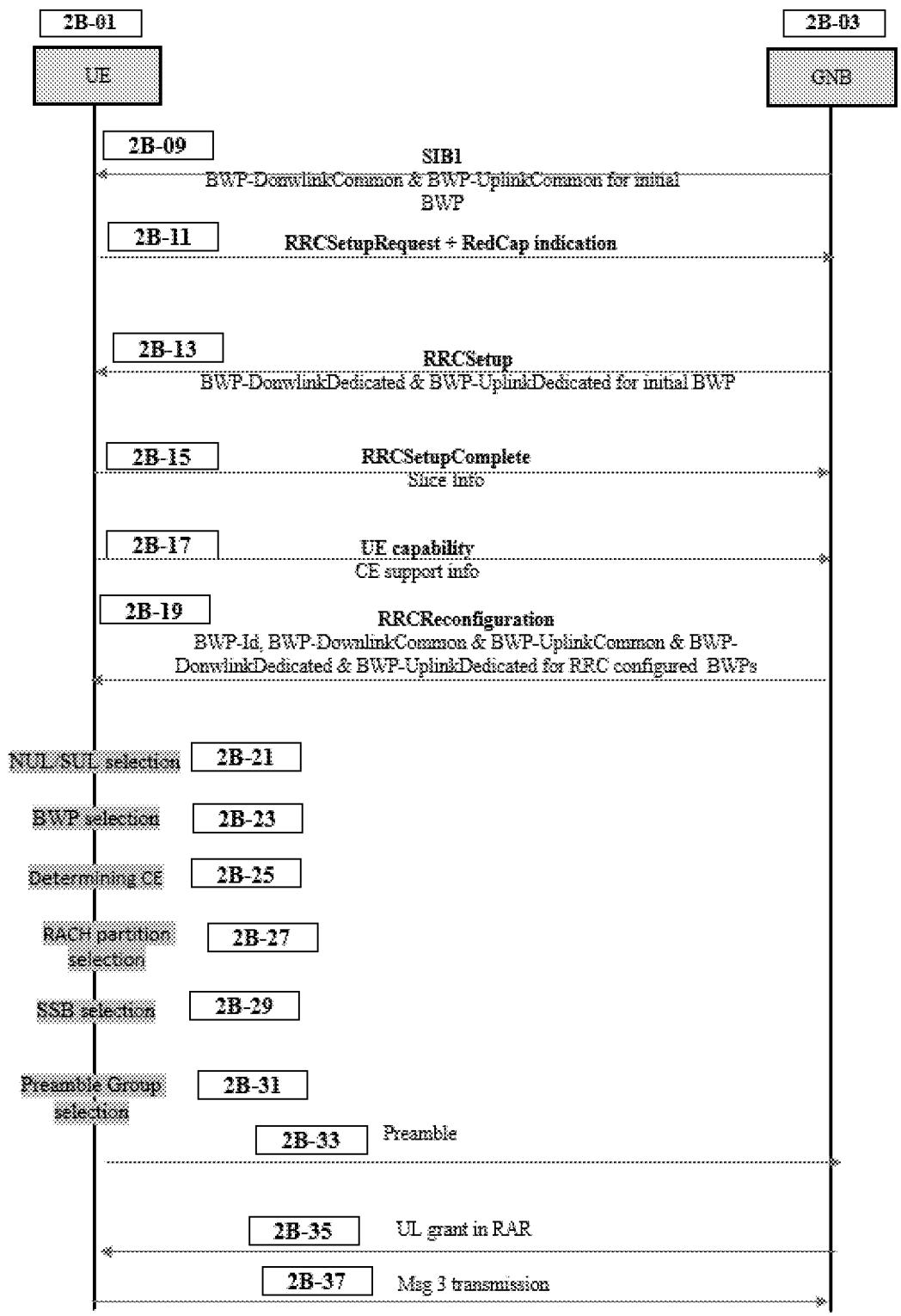
FIG. 2B is a diagram illustrating operations of a terminal in a connected state and a base station according to an example of the present disclosure.

FIG. 2b illustrates the operations of UE in RRC_CONNECTED and GNB for random access procedure.

In 2A-13, GNB transmits and UE receives SIB1 in the suitable cell. SIB1 includes BWP-DownlinkCommon for initial downlink BWP and BWP-UplinkCommon for initial uplink BWP of a normal uplink and BWP-UplinkCommon for initial uplink BWP of a supplementary uplink.

UE performs random access procedure as illustrated in FIG. 2a.

In 2B-11, UE transmits and GNB receives RRCSetup message included in Msg3. If the UE is RedCap UE, LCID of the MAC SDU containing RRCSetup is set to a first value. If the UE is not RedCap UE, LCID of the MAC SDU containing RRCSetup is set to a second value. The first value indicates CCCH of size 48 bit sent by a RedCap UE. The second value indicates CCCH of size 48 bit not sent by a RedCap UE.

GNB determines whether the UE is RedCap UE or not based at least in part on the LCID of the CCCH included in the Msg 3. GNB determines the dedicate BWP configuration for the initial downlink BWP and the initial uplink BWP.

In 2B-13, GNB transmits and UE receives RRCSetup message. UE configures the dedicate part of the initial BWPs based at least in part on the configuration information contained in the RRCSetup message.

In 2B-15, UE transmits and GNB receives RRCSetupComplete message. The message includes the list of S-NSSAIs that are configured for the UE.

In 2B-17, UE transmits and GNB receives UECapabilityInformation message. The message includes plurality of frequency band specific capability information. Each band specific capability information includes band indicator and an indicator indicating whether the UE supports Msg 3 repetition mode (Coverage Enhancement or CovEnh) or not.

In Msg 3 repetition mode, UE transmits the Msg 3 repeatedly within a bundle. The number of repetitions is indicated in the uplink grant of RAR.

Based at least in part on the Msg 3 repetition capability information in UECapabilityInformation message, Slice information in RRCSetupComplete message and LCID for CCCH in Msg 3, GNB determines how many and what kind of non-initial BWPs to be configured for the UE.

UE can be configured with a single initial DL BWP and a single initial UL BWP and a plurality of non-initial DL BWPs and a plurality of non-initial UL BWPs.

A DL BWP is configured by BWP-DownlinkCommon and BWP-DownlinkDedicate. An UL BWP is configured by BWP-UplinkCommon and BWP-UplinkDedicate.

BWP-DownlinkCommon for initial DL BWP is provided in SIB1. BWP-DownlinkDedicate for initial DL BWP is provided in a DL RRC message such as RRCSetup and RRCReconfiguration and RRCResume.

BWP-UplinkCommon for initial UL BWP is provided in SIB1. BWP-UplinkDedicate for initial UL BWP is provided in a DL RRC message such as RRCSetup and RRCReconfiguration and RRCResume.

BWP-DownlinkCommon and BWP-DownlinkDedicate for non-initial DL BWP are provided in the DL RRC message such as RRCSetup and RRCReconfiguration and RRCResume.

BWP-UplinkCommon and BWP-UplinkDedicate for non-initial UL BWP are provided in the DL RRC message such as RRCSetup and RRCReconfiguration and RRCResume.

A BWP is associated with a bwp-id. bwp-id for initial DL BWP is fixed to a specific value. The specific value is zero. bwp-id for non-initial DL BWP is explicitly configured in the DL RRC message such as RRCSetup and RRCReconfiguration and RRCResume.

GNB can configures a plurality of non-initial BWPs for a UE. A non-initial UL BWP can include a plurality of RACH-ConfigCommon for UE.

A feature can be either radio channel condition related feature or UE type related feature or service type related feature or a combined feature.

CovEnh is radio channel condition related feature. RedCap is UE type related feature. Slice is service type related feature. SDT is combined feature related to the service type and to radio channel condition.

Feature combinations indicated in the initial UL BWP can include either radio channel condition related feature or UE type related feature or service type related feature or a combined feature. Hence UE consider radio condition and UE type and service type when UE selects feature combination in initial UL BWP.

Feature combinations indicated in the non-initial UL BWP can include only radio channel condition related feature. Hence UE consider only radio condition when UE selects feature combination in non-initial (also called RRC-configured) UL BWP.

In 2B-19, GNB transmits and UE receives RRCReconfiguration message. The RRCReconfiguration message includes configuration information for a plurality of non-initial BWPs. GNB and UE configures non-initial BWPs according to the configuration information.

At some point of time, random access procedure is triggered.

Random access procedure can be triggered by UE itself or by PDCCH order sent from GNB.

If PDCCH order is received, UE selects the uplink and the preamble and the SSB based at least in part on the values of Random Access Preamble index field and UL/SUL indicator field and the SS/PBCH index field indicated in the PDCCH order (DCI format 1_0 of which Frequency domain resource assignment field are of all ones).

UE does not selects BWP but performs the random access procedure in the currently active UL BWP.

UE selects a RACH partition based at least in part on the value of RACH-Id field indicated in the PDCCH order.

UE selects the RACH-ConfigCommon, among a plurality of RACH-ConfigCommon of the currently active UL BWP, indicated by the RACH-Id field.

PDCCH order is addressed by C-RNTI and contains following fields in the order: DCI format identifier field, Frequency domain resource assignment field, random access preamble index field, UL/SUL indicator field, SS/PBCH index field, PRACH Mask index field and RACH-Id field.

If Random access procedure is triggered by UE itself, UE performs step 2B-21 up to step 2B-31 to selects the uplink and the preamble and the SSB and the BWP and the RACH partition.

In 2B-21, UE selects, based at least in part on rsrp-ThresholdSSB-SUL indicated in the first RACH-ConfigCommon for NUL, an uplink where random access procedure is to be performed. The first RACH-ConfigCommon is the one included in the BWP-UplinkCommon for the initial UL BWP.

If the RSRP of the downlink pathloss reference is less than rsrp-ThresholdSSB-SUL, UE select the NUL carrier for performing random access procedure.

If the RSRP of the downlink pathloss reference is greater than or equal to rsrp-ThresholdSSB-SUL, UE select the SUL carrier for performing random access procedure.

The downlink pathloss reference could be a SSB with the best RSRP among the SSBs of the currently active DL BWP. Or it could be a SSB with the best RSRP among the SSBs of the initial DL BWP. It could be any SSB of the cell.

In 2B-23, UE selects a BWP for random access procedure.

Upon initiation of the Random Access procedure on a Serving Cell, after the selection of carrier for performing Random Access procedure, if PRACH occasions are not configured for the active UL BWP, the UE switch the active UL BWP to BWP indicated by initialUplinkBWP. If the Serving Cell is an SpCell, UE switches the active DL BWP to BWP indicated by initialDownlinkBWP.

Or, if PRACH occasions for the target feature combination are not configured for the active UL BWP, the UE switch the active UL BWP to BWP indicated by initialUplinkBWP. If the Serving Cell is an SpCell, UE switches the active DL BWP to BWP indicated by initialDownlinkBWP.

Or if CovEnh is required and if PRACH occasions for the CovEnh is not configured for the active UL BWP, the UE switch the active UL BWP to BWP indicated by initialUplinkBWP. If the Serving Cell is an SpCell, UE switches the active DL BWP to BWP indicated by initialDownlinkBWP.

In 2B-25, the UE determines whether to use the Msg 3 repetition mode (CovEnh). If rsrp-ThresholdSSB-CE is present in the first RACH-ConfigCommon and the RSRP of the downlink path loss reference is lower than rsrp-ThresholdSSB-CE, the UE determines to use the Msg 3 repetition mode. If rsrp-ThresholdSSB-CE is absent in the first RACH-ConfigCommon or the RSRP of the downlink path loss reference is higher than rsrp-ThresholdSSB-CE, the UE determines not to use the Msg 3 repetition mode. The downlink pathloss reference could be either SSB or CSI-RS of the currently active DL BWP. The first RACH-ConfigCommon is the one included in the BWP-UplinkCommon of the currently active UL BWP.

In 2B-27, UE selects a RACH partition in consideration of target feature combination and the feature combination of the RACH partitions.

If the currently active UL BWP is initial UL BWP, the target feature combination includes UE type related feature, if applicable, and service type related feature, if applicable, and radio channel condition related feature.

If the currently active UL BWP is non-initial UL BWP, the target feature combination includes only radio channel condition related feature.

In 2B-29, UE selects a SSB based at least in part on a rsrp-ThresholdSSB.

The UE uses the rsrp-ThresholdSSB of the selected RACH partition (or feature combination) of the currently active UL BWP. For example, if the terminal selects the default RACH-ConfigCommon, the UE applies the rsrp-ThresholdSSB of the first RACH-ConfigCommon. If the UE selects the $n^{th}$ RACH-ConfigCommon-fc, the UE applies the rsrp-ThresholdSSB of the second RACH-ConfigCommon included in the $n^{th}$ RACH-ConfigCommon-fc. The first RACH-ConfigCommon and the second RACH-ConfigCommon are the ones included in the BWP-UplinkCommon of the currently active UL BWP.

In 2B-31, UE selects preamble group based at least in part on the selected RACH partition (or feature combination).

If the potential Msg3 size (UL data available for transmission plus MAC subheader(s) and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB, UE select the Random Access Preamble group B.

If the Random Access procedure was initiated for the CCCH logical channel and the CCCH SDU size plus MAC subheader is greater than ra-Msg3SizeGroupA, UE selects the Random Access Preamble group B.

If the Random Access procedure was not initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was initiated for the CCCH logical channel, and If the potential Msg3 size (UL data available for transmission plus MAC subheader(s) and, where required, MAC CEs) is not greater than ra-Msg3SizeGroupA, UE selects the Random Access Preamble group A.

If the Random Access procedure was not initiated for the CCCH logical channel, and If the potential Msg3 size (UL data available for transmission plus MAC subheader(s) and, where required, MAC CEs) is greater than ra-Msg3SizeGroupA, and the pathloss is not less than PCMAX (of the Serving Cell performing the Random Access Procedure)-preambleReceivedTargetPower-msg3-DeltaPreamble-messagePowerOffsetGroupB, UE select the Random Access Preamble group A.

One msg3-DeltaPreamble may be included in the first part of PUSCH-ConfigCommon, and multiple msg3-DeltaPreambles may be included in the second part. msg3-DeltaPreamble of the second part is a parameter for featureCombination/RACH partition/second RACH-ConfigCommon. The second part is an expanded part and is located after the first portion.

Alternatively, RACH-ConfigCommon-fc may include msg3-DeltaPreamble to be applied to the corresponding featureCombination.

If the UE has selected the default RACH-ConfigCommon, the UE selects a random access preamble group using msg3-DeltaPreamble of PUSCH-ConfigCommon and Msg3SizeGroupA, preambleReceivedTargetPower and messagePowerOffsetGroupB of the first RACH-ConfigCommon. If msg3-DeltaPreamble is not included in PUSCH-ConfigCommon, the UE uses 0.

If the UE has selected the $n^{th}$ RACH-ConfigCommon-fc, the UE selects a random access preamble group using msg3-DeltaPreamble included in the $n^{th}$ RACH-ConfigCommon-fc and Msg3SizeGroupA, preambleReceivedTargetPower and messagePowerOffsetGroupB included in the second RACH-ConfigCommon included in the $n^{th}$ RACH-ConfigCommon-fc. If msg3-DeltaPreamble is not included in the $n^{th}$ RACH-ConfigCommon-fc, the UE uses 0.

If the UE selects the $n^{th}$ RACH-ConfigCommon-fc, the UE selects the $n^{th}$ msg3-DeltaPreamble of the second part of PUSCH-ConfigCommon and Msg3SizeGroupA, preambleReceivedTargetPower and messagePowerOffsetGroupB of the second RACH-ConfigCommon included in the $n^{th}$ RACH-ConfigCommon-fc to select a random access preamble group.

The PUSCH-ConfigCommon and the first RACH-ConfigCommon and $n^{th}$ RACH-ConfigCommon-fc are the ones included in the BWP-UplinkCommon of the currently active UL BWP.

UE select a preamble randomly with equal probability from the preambles associated with the selected SSB from the selected preamble group. UE sets the PREAMBLE_INDEX to a ra-PreambleIndex corresponding to the selected preamble.

UE determines the next available PRACH occasion from the PRACH occasions corresponding to the selected SSB. UE shall select a PRACH occasion randomly with equal probability amongst the consecutive PRACH occasions indicated by PRACH configuration index of RACH-ConfigCommon of a specific BWP of the selected uplink. The specific BWP is the currently active UL BWP.

In 2B-33, UE transmits the selected preamble in the selected PRACH occasion in the currently active UL BWP in the selected uplink.

UE sets PREAMBLE_RECEIVED_TARGET_POWER to preambleReceivedTargetPower+DELTA_PREAMBLE+ (PREAMBLE_POWER_RAMPING_COUNTER−1)×powerRampingStep+POWER_OFFSET_2STEP_RA.

UE sets the transmission power of the preamble to the sum of PREAMBLE_RECEIVED_TARGET_POWER and the pathloss.

If the UE selects the default RACH-ConfigCommon, the UE uses the preambleReceivedTargetPower and powerRampingStep of the first RACH-ConfigCommon. The UE sets POWER_OFFSET_2STEP_RA to 0. The UE sets DELTA_PREAMBLE according to the preamble format determined from the prach-ConfigurationIndex indicated in the first RACH-ConfigCommon. DELTA_PREAMBLE is predefined for each preamble format. PREAMBLE_POWER_RAMPING_COUNTER is initialized to 1 and increases by 1 for each preamble transmission.

If the UE selects the $n^{th}$ RACH-ConfigCommon-fc, the UE uses the preambleReceivedTargetPower and powerRampingStep of the second RACH-ConfigCommon of the $n^{th}$ RACH-ConfigCommon-fc. The UE sets POWER_OFFSET_2STEP_RA to 0. The UE sets DELTA_PREAMBLE according to the preamble format determined from the prach-ConfigurationIndex indicated in the second RACH-ConfigCommon. DELTA_PREAMBLE is predefined for each preamble format. PREAMBLE_POWER_RAMPING_COUNTER is initialized to 1 and increases by 1 for each preamble transmission.

The first RACH-ConfigCommon and the $n^{th}$ RACH-ConfigCommon-fc are the ones included in the BWP-UplinkCommon of the currently active UL BWP.

In 2B-35, UE receives RAR including an uplink grant.

To receive RAR, UE start the ra-ResponseWindow configured by RACH-ConfigCommon at the first PDCCH occasion from the end of the Random Access Preamble transmission. UE monitors the PDCCH of the SpCell for Random Access Response(s) identified by the RA-RNTI while the ra-ResponseWindow is running.

In monitoring PDCCH, UE applies searchSpace indicated by ra-SearchSpace.

If the UE selects the default RACH-ConfigCommon, the UE monitors the RA-RNTI by applying the ra-SearchSpace of the first part of the PDCCH-ConfigCommon.

If the UE selects the $n^{th}$ RACH-ConfigCommon-fc, the UE monitors the RA-RNTI by applying the ra-SearchSpace included in the $n^{th}$ RACH-ConfigCommon-fc.

If the UE selects the $n^{th}$ RACH-ConfigCommon-fc, the UE monitors the RA-RNTI by applying the $n^{th}$ ra-SearchSpace of the second part of the PDCCH-ConfigCommon.

The first RACH-ConfigCommon and the $n^{th}$ RACH-ConfigCommon-fc are the ones included in the BWP-UplinkCommon of the currently active UL BWP.

PDCCH-ConfigCommon is the one included in the BWP-DownlinkCommon of the currently active DL BWP (or DL BWP with the same bwp-id as the currently active UL BWP)

UE consider Random Access Response reception is successful if the Random Access Response contains a MAC subPDU with Random Access Preamble identifier corresponding to the transmitted PREAMBLE_INDEX.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that the UE has to apply. The size of the Timing Advance Command field is 12 bits. The Uplink Grant field indicates the resources to be used on the uplink. The size of the UL Grant field is 27 bits. The Temporary C-RNTI field indicates the temporary identity that is used by the UE during Random Access. The size of the Temporary C-RNTI field is 16 bits Uplink Grant field further includes PUSCH time resource allocation field. PUSCH time resource allocation field is 4 bit.

A single first Pusch-TimeDomainAllocationList may be included in the first part of PUSCH-ConfigCommon, and a plurality of second Pusch-TimeDomainAllocationLists may be included in the second part. The second Pusch-TimeDomainAllocationList of the second part is a parameter for featureCombination/RACH partition/second RACH-ConfigCommon. The second part is an extended part and is located after the first part.

Alternatively, RACH-ConfigCommon-fc may include a second Pusch-TimeDomainAllocationList to be applied to the corresponding featureCombination.

If the UE selects the default RACH-ConfigCommon, the UE determines the time domain relationship between the PDCCH and the PUSCH by using the first Pusch-TimeDomainAllocationList of the PUSCH-ConfigCommon.

If the UE selects the $n^{th}$ RACH-ConfigCommon-fc, the UE determines the time domain relationship between the PDCCH and the PUSCH by using the second Pusch-TimeDomainAllocationList included in the $n^{th}$ RACH-ConfigCommon-fc. If Pusch-TimeDomainAllocationList is not included in the $n^{th}$ RACH-ConfigCommon-fc, the UE uses first Pusch-TimeDomainAllocationList of the first part of PUSCH-ConfigCommon or default PUSCH time domain resource allocation table.

If the UE selects the $n^{th}$ RACH-ConfigCommon-fc, the UE determines the time domain relationship between the PDCCH and the PUSCH using the $n^{th}$ second Pusch-TimeDomainAllocationList of the second part of the PUSCH-ConfigCommon. If the $n^{th}$ second Pusch-TimeDomainAllocationList does not exist in the second part, the UE uses the Pusch-TimeDomainAllocationList of the first part of PUSCH-ConfigCommon or default PUSCH time domain resource allocation table.

If UE selected the default RACH-ConfigCommon and If PUSCH-ConfigCommon of the currently active UL BWP includes the first pusch-TimeDomainResourceAllocationList, h indicates $(h+1)^{th}$ entry of pusch-TimeDomainResourceAllocationList.

If UE selected $n^{th}$ RACH-ConfigCommon-fc and If PUSCH-ConfigCommon includes the $n^{th}$ secondpusch-TimeDomainResourceAllocationList, h indicates $(h+1)^{th}$ entry of the $n^{th}$ second pusch-TimeDomainResourceAllocationList.

Or if UE selected $n^{th}$ RACH-ConfigCommon-fc and If $n^{th}$ RACH-ConfigCommon-fc includes a second pusch-TimeDomainResourceAllocationList, h indicates $(h+1)^{th}$ entry of the second pusch-TimeDomainResourceAllocationList.

If UE selected the default RACH-ConfigCommon and if the first PUSCH-ConfigCommon does not includes the first pusch-TimeDomainResourceAllocationList, h indicates row index (h+1) of the default PUSCH time domain resource allocation table.

If UE selected $n^{th}$ RACH-ConfigCommon-fc and If PUSCH-ConfigCommon does not includes the $n^{th}$ second pusch-TimeDomainResourceAllocationList, h indicates row index (h+1) of the default PUSCH time domain resource allocation table.

Or if UE selected $n^{th}$ RACH-ConfigCommon-fc and If $n^{th}$ RACH-ConfigCommon-fc does not includes the $n^{th}$ second pusch-TimeDomainResourceAllocationList, h indicates row index (h+1) of the default PUSCH time domain resource allocation table.

The first RACH-ConfigCommon and the $n^{th}$ RACH-ConfigCommon-fc and PUSCH-ConfigCommon are the ones included in the BWP-UplinkCommon of the currently active UL BWP.

Each row of the default PUSCH time domain resource allocation table is associated with k2 which is a function of j.and i. UE determines j according to the PUSCH subcarrier spacing. UE determines i based at least in part on h. UE determines k2 by adding the determined j and determined i. In other words, UE determines k2 based at least in part on the j determined based at least in part on the PUSCH subcarrier spacing and the row index determined based at least in part on the h.

UE determines the time slot for PUSCH transmission scheduled by RAR. If a UE receives a PDSCH with a RAR message ending in slot n for a corresponding PRACH transmission from the UE, the UE transmits the PUSCH in slot (n+k2+delta). k2 and delta are subcarrier spacing specific and determined as below.

If pusch-TimeDomainResourceAllocationList is not included in PUSCH-ConfigCommon for a non-initial UL BWP in ServingCellConfigCommon, k2 is determined based at least in part on h and j and i. j is determined based at least in part on subcarrier spacing IE included in BWP-UplinkCommon IE for the non-initial UL BWP in ServingCellConfigCommon in a DL RRC message. If subcarrier spacing IE indicates 15 kHz or 30 kHz, j is 1. If subcarrier spacing IE indicates 60 kHz, j is 2. If subcarrier spacing IE indicates 120 kHz, j is 3.

Delta is determined based at least in part on subcarrier spacing IE included in BWP-UplinkCommon IE for a non-initial UL BWP in ServingCellConfigCommon in a DL RRC message. If subcarrier spacing IE indicates 15 kHz, delta is 2. If subcarrier spacing IE indicates 30 kHz, delta is 3. If subcarrier spacing IE indicates 60 kHz, delta is 4. If subcarrier spacing IE indicates 120 kHz, delta is 6.

In 2B-37, the UE performs Msg 3 transmission at the determined slot according to the UL grant in the received RAR.

UE determines the PUSCH transmission power by summing offset, pathloss and other parameters related with number of PRBs and power control commands.

offset is sum of preambleReceivedTargetPower and msg3-DeltaPreamble.

One msg3-DeltaPreamble may be included in the first part of PUSCH-ConfigCommon, and multiple msg3-DeltaPreambles may be included in the second part of PUSCH-ConfigCommon. msg3-DeltaPreamble of the second part is a parameter for featureCombination/RACH partition/second RACH-ConfigCommon. The second part is an extended part and is located after the first part.

Alternatively, RACH-ConfigCommon-fc may include msg3-DeltaPreamble to be applied to the corresponding featureCombination.

If the UE selects the default RACH-ConfigCommon, the UE uses msg3-DeltaPreamble of PUSCH-ConfigCommon and preambleReceivedTargetPower of the first RACH-ConfigCommon.

If the UE selects the $n^{th}$ RACH-ConfigCommon-fc, the UE uses msg3-DeltaPreamble and preambleReceivedTargetPower included in the $n^{th}$ RACH-ConfigCommon-fc.

If the UE selects the $n^{th}$ RACH-ConfigCommon-fc, the UE uses the $n^{th}$ msg3-DeltaPreamble of the second part of the PUSCH-ConfigCommon and the preambleReceivedTargetPower included in the $n^{th}$ RACH-ConfigCommon-fc.

The first RACH-ConfigCommon and the $n^{th}$ RACH-ConfigCommon-fc and PUSCH-ConfigCommon are the ones included in the BWP-UplinkCommon of the currently active UL BWP.

UE generates a Msg3. The Msg3 may include buffer status report MAC CE and C-RNTI MAC CE.

UE transmits the Msg3. UE starts contention-Resolution-Timer. The timer is set by the value indicated in the selected RACH-ConfigCommon of the selected uplink carrier. The RACH-ConfigCommon is selected from the plurality of RACH-ConfigCommon in the BWP-UplinkCommon of the currently active UL BWP.

GNB receives the Msg3 and process Buffer Status Report included in Msg 3. GNB may transmit UL grant for the UE.

Random Access procedure is completed when UE receives UL grant addressed by UE's C-RNTI.

In the followings, the operation of UE and GNB are illustrated when the alternative signaling structure of FIG. 1g is used.

GNB includes a first RACH-ConfigCommon and zero or one or more second RACH-ConfigCommon in a BWP-UplinkCommon for an uplink.

GNB includes zero or one or more featureCombinations in the first RACH-ConfigCommon and one or more feature-Combinations in each of a second RACH-ConfigCommon.

UE selects a featureCombinations, from a plurality of featureCombinations included in a plurality of RACH-ConfigCommon of the BWP-UplinkCommon of the selected uplink, based at least in part on the target feature combination that triggers the random access procedure.

UE selects a RACH-ConfigCommon based at least in part on the selected featureCombination (i.e., the RACH-ConfigCommon comprising the selected featureCombination is selected).

If no featureCombination matches with the target feature combination, the first RACH-ConfigCommon is selected.

GNB includes a rsrp-ThresholdSSB in the non-extended part of the first RAH-ConfigCommon. GNB includes zero or one or more rsrp-ThresholdSSBs in the extended part of the first RACH-ConfigCommon. GNB includes zero or one rsrp-ThresholdSSBs in each featureCombinationParameter of the first RACH-ConfigCommon.

GNB includes zero or one rsrp-ThresholdSSB in the non-extended part of each of the second RAH-ConfigCommon. GNB includes zero or one or more rsrp-ThresholdSSBs in the extended part of each of the second RACH-ConfigCommon. GNB includes zero or one rsrp-ThresholdSSBs in each featureCombinationParameter of the second RACH-ConfigCommon.

UE selects a SSB based at least in part on a rsrp-ThresholdSSB.

If the selected featureCombinationParameter is included in the first rach-ConfigCommon, and if the selected featureCombinationParameter does not include a rsrp-ThresholdSSB, UE applies a rsrp-ThresholdSSB in the non-extended part of the first RACH-ConfigCommon.

If the selected featureCombinationParameter is included in the first rach-ConfigCommon, and if the selected featureCombinationParameter includes a rsrp-ThresholdSSB, UE applies the rsrp-ThresholdSSB in the selected featureCombinationParameter.

If the first RACH-ConfigCommon is selected because there is no featureCombination matching with the target featureCombination, UE applies a rsrp-ThresholdSSB in the non-extended part of the first RACH-ConfigCommon.

If the selected featureCombinationParameter is included in the second rach-ConfigCommon, and if the selected featureCombinationParameter does not include a rsrp-ThresholdSSB, UE applies a rsrp-ThresholdSSB in the non-extended part of the second RACH-ConfigCommon.

If the selected featureCombinationParameter is included in the second rach-ConfigCommon, and if the selected featureCombinationParameter includes a rsrp-ThresholdSSB, UE applies the rsrp-ThresholdSSB in the selected featureCombinationParameter of the selected second RACH-ConfigCommon.

GNB includes a ra-Msg3SizeGroupA in the non-extended part of the first RAH-ConfigCommon. GNB includes zero or one or more ra-Msg3SizeGroupA in the extended part of the first RACH-ConfigCommon. GNB includes zero or one ra-Msg3SizeGroupA in each featureCombinationParameter of the first RACH-ConfigCommon.

GNB includes zero or one ra-Msg3SizeGroupA in the non-extended part of each of the second RAH-ConfigCommon. GNB includes zero or one or more ra-Msg3SizeGroupA in the extended part of each of the second RACH-ConfigCommon. GNB includes zero or one ra-Msg3SizeGroupA in each featureCombinationParameter of the second RACH-ConfigCommon.

GNB includes a messagePowerOffsetGroupB in the non-extended part of the first RAH-ConfigCommon. GNB includes zero or one or more messagePowerOffsetGroupB in the extended part of the first RACH-ConfigCommon. GNB includes zero or one messagePowerOffsetGroupB in each featureCombinationParameter of the first RACH-ConfigCommon.

GNB includes zero or one messagePowerOffsetGroupB in the non-extended part of each of the second RAH-ConfigCommon. GNB includes zero or one or more messagePowerOffsetGroupB in the extended part of each of the second RACH-ConfigCommon. GNB includes zero or one messagePowerOffsetGroupB in each featureCombinationParameter of the second RACH-ConfigCommon.

GNB includes a preambleReceivedTargetPower in the non-extended part of the first RAH-ConfigCommon. GNB includes zero or one or more preambleReceivedTargetPower in the extended part of the first RACH-ConfigCommon. GNB includes zero or one preambleReceivedTargetPower in each featureCombinationParameter of the first RACH-ConfigCommon.

GNB includes zero or one preambleReceivedTargetPower in the non-extended part of each of the second RAH-ConfigCommon. GNB includes zero or one or more preambleReceivedTargetPower in the extended part of each of the second RACH-ConfigCommon. GNB includes zero or one preambleReceivedTargetPower in each featureCombinationParameter of the second RACH-ConfigCommon.

GNB includes zero or one msg3-DeltaPreamble in non-extended part of the PUSCH-ConfigCommon and zero or one or more msg3-DeltaPreamble in extended part of the first RACH-ConfigCommon.

GNB includes zero or one or more msg3-DeltaPreamble in the extended part of each of the second RACH-ConfigCommon. GNB includes zero or one msg3-DeltaPreamble in each featureCombinationParameter of the second RACH-ConfigCommon.

UE selects a Random Access Preamble group based at least in part on a ra-Msg3SizeGroupA and a messagePowerOffsetGroupB and a preambleReceivedTargetPower and a msg3-DeltaPreamble.

UE determines PUSCH transmission power for Msg 3 based at least in part on preambleReceivedTargetPower and msg3-DeltaPreamble and pathloss of downlink pathloss reference.

If the selected featureCombinationParameter is included in the first rach-ConfigCommon, and if the selected featureCombinationParameter does not include ra-Msg3SizeGroupA and messagePowerOffsetGroupB, UE applies a ra-Msg3SizeGroupA and messagePowerOffsetGroupB in the non-extended part of the first RACH-ConfigCommon.

If the selected featureCombinationParameter is included in the first rach-ConfigCommon, and if the selected featureCombinationParameter includes ra-Msg3SizeGroupA and messagePowerOffsetGroupB, UE applies ra-Msg3SizeGroupA and messagePowerOffsetGroupB in the selected featureCombinationParameter.

If the first RACH-ConfigCommon is selected because there is no featureCombination matching with the target featureCombination, UE applies ra-Msg3SizeGroupA and messagePowerOffsetGroupB in the non-extended part of the first RACH-ConfigCommon.

If the selected featureCombinationParameter is included in the second rach-ConfigCommon, and if the selected featureCombinationParameter does not include ra-Msg3SizeGroupA and messagePowerOffsetGroupB, UE applies ra-Msg3SizeGroupA and messagePowerOffsetGroupB in the non-extended part of the second RACH-ConfigCommon.

If the selected featureCombinationParameter is included in the second rach-ConfigCommon, and if the selected featureCombinationParameter includes ra-Msg3SizeGroupA and messagePowerOffsetGroupB, UE applies the ra-Msg3SizeGroupA and messagePowerOffsetGroupB in the selected featureCombinationParameter of the selected second RACH-ConfigCommon.

If the selected featureCombinationParameter is included in the first rach-ConfigCommon, and if the selected featureCombinationParameter does not include preambleReceivedTargetPower, UE applies preambleReceivedTargetPower in the non-extended part of the first RACH-ConfigCommon.

If the selected featureCombinationParameter is included in the first rach-ConfigCommon, and if the selected featureCombinationParameter includes preambleReceivedTargetPower, UE applies preambleReceivedTargetPower in the selected featureCombinationParameter.

If the first RACH-ConfigCommon is selected because there is no featureCombination matching with the target featureCombination, UE applies preambleReceivedTargetPower in the non-extended part of the first RACH-ConfigCommon.

If the selected featureCombinationParameter is included in the second rach-ConfigCommon, and if the selected featureCombinationParameter does not include preambleReceivedTargetPower, UE applies preambleReceivedTargetPower in the non-extended part of the second RACH-ConfigCommon.

If the selected featureCombinationParameter is included in the second rach-ConfigCommon, and if the selected featureCombinationParameter includes preambleReceivedTargetPower, UE applies the preambleReceivedTargetPower in the selected featureCombinationParameter of the selected second RACH-ConfigCommon.

If the selected featureCombinationParameter is included in the first rach-ConfigCommon, and if the selected featureCombinationParameter does not include msg3-DeltaPreamble, UE applies msg3-DeltaPreamble in the non-extended part of the PUSCH-ConfigCommon. If msg3-DeltaPreamble is not included in the non-extended part of PUSCH-Config-Common, the UE applies 0. If the selected featureCombinationParameter is included in the first rach-ConfigCommon, and if the selected featureCombinationParameter includes msg3-DeltaPreamble, UE applies msg3-DeltaPreamble in the selected featureCombinationParameter.

If the first RACH-ConfigCommon is selected because there is no featureCombination matching with the target featureCombination, UE applies msg3-DeltaPreamble in the non-extended part of the PUSCH-ConfigCommon. If msg3-DeltaPreamble is not included in the non-extended part of PUSCH-ConfigCommon, the UE applies 0.

If the selected featureCombinationParameter is included in the second rach-ConfigCommon, and if the selected featureCombinationParameter does not include msg3-DeltaPreamble, UE applies msg3-DeltaPreamble in the extended part of the PUSCH-ConfigCommon. If msg3-DeltaPreamble is not included in the extended part of PUSCH-ConfigCommon, the UE applies 0.

If the selected featureCombinationParameter is included in the second rach-ConfigCommon, and if the selected featureCombinationParameter includes msg3-DeltaPreamble, UE applies the msg3-DeltaPreamble in the selected featureCombinationParameter of the selected second RACH-ConfigCommon.

GNB includes a powerRampingStep in the non-extended part of the first RAH-ConfigCommon. GNB includes zero or one or more powerRampingStep in the extended part of the first RACH-ConfigCommon. GNB includes zero or one powerRampingStep in each featureCombinationParameter of the first RACH-ConfigCommon.

GNB includes zero or one powerRampingStep in the non-extended part of each of the second RAH-ConfigCommon. GNB includes zero or one or more powerRampingStep in the extended part of each of the second RACH-ConfigCommon. GNB includes zero or one powerRampingStep in each featureCombinationParameter of the second RACH-ConfigCommon.

GNB includes a prach-ConfigurationIndex in the non-extended part of the first RAH-ConfigCommon. GNB does not include prach-ConfigurationIndex in the extended part of the first RACH-ConfigCommon.

GNB includes a prach-ConfigurationIndex in the non-extended part of the second RAH-ConfigCommon. GNB does not include prach-ConfigurationIndex in the extended part of the second RACH-ConfigCommon.

UE determines the transmission power of the preamble based at least in part on the preambleReceivedTargetPower and powerRampingStep and prach-ConfigurationIndex.

If the selected featureCombinationParameter is included in the first rach-ConfigCommon, and if the selected featureCombinationParameter does not include a powerRampingStep, UE applies a powerRampingStep in the non-extended part of the first RACH-ConfigCommon.

If the selected featureCombinationParameter is included in the first rach-ConfigCommon, and if the selected featureCombinationParameter includes a powerRampingStep, UE applies the powerRampingStep in the selected featureCombinationParameter.

If the first RACH-ConfigCommon is selected because there is no featureCombination matching with the target featureCombination, UE applies a powerRampingStep in the non-extended part of the first RACH-ConfigCommon.

If the selected featureCombinationParameter is included in the second rach-ConfigCommon, and if the selected featureCombinationParameter does not include a powerRampingStep, UE applies a powerRampingStep in the non-extended part of the second RACH-ConfigCommon.

If the selected featureCombinationParameter is included in the second rach-ConfigCommon, and if the selected featureCombinationParameter includes a powerRampingStep, UE applies the powerRampingStep in the selected featureCombinationParameter of the selected second RACH-ConfigCommon.

If the selected featureCombinationParameter is included in the first rach-ConfigCommon, and if the selected featureCombinationParameter does not include preambleReceivedTargetPower, UE applies preambleReceivedTargetPower in the non-extended part of the first RACH-ConfigCommon.

If the selected featureCombinationParameter is included in the first rach-ConfigCommon, and if the selected featureCombinationParameter includes preambleReceivedTargetPower, UE applies preambleReceivedTargetPower in the selected featureCombinationParameter.

If the first RACH-ConfigCommon is selected because there is no featureCombination matching with the target featureCombination, UE applies preambleReceivedTargetPower in the non-extended part of the first RACH-ConfigCommon.

If the selected featureCombinationParameter is included in the second rach-ConfigCommon, and if the selected featureCombinationParameter does not include preambleReceivedTargetPower, UE applies preambleReceivedTargetPower in the non-extended part of the second RACH-ConfigCommon.

If the selected featureCombinationParameter is included in the second rach-ConfigCommon, and if the selected featureCombinationParameter includes preambleReceivedTargetPower, UE applies the preambleReceivedTargetPower in the selected featureCombinationParameter of the selected second RACH-ConfigCommon.

If the first RACH-ConfigCommon is selected, UE applies a prach-ConfigurationIndex in the non-extended part of the first RACH-ConfigCommon.

If a second RACH-ConfigCommon is selected, UE applies a prach-ConfigurationIndex in the non-extended part of the second RACH-ConfigCommon.

GNB includes a ra-ResponseWindow in the non-extended part of the first RAH-ConfigCommon. GNB includes zero or one or more ra-ResponseWindow in the extended part of the first RACH-ConfigCommon. GNB includes zero or one ra-ResponseWindow in each featureCombinationParameter of the first RACH-ConfigCommon.

GNB includes zero or one ra-ResponseWindow in the non-extended part of each of the second RAH-ConfigCommon. GNB includes zero or one or more ra-ResponseWindow in the extended part of each of the second RACH-ConfigCommon. GNB includes zero or one ra-ResponseWindow in each featureCombinationParameter of the second RACH-ConfigCommon.

GNB includes a ra-SearchSpace in the non-extended part of the PDCCH-ConfigCommon of the DL BWP linked with (associated with) the UL BWP. GNB includes zero or one or more ra-SearchSpace in the extended part of the PDCCH-ConfigCommon of the DL BWP linked with (associated with) the UL BWP.

GNB includes zero or one of ra-SearchSpace in each of the featureCombinationParameter of the first RACH-ConfigCommon. GNB includes zero or one of ra-SearchSpace in each of the featureCombinationParameter of the second RACH-ConfigCommon.

UE determines RAR based at least in part on ra-ResponseWindow. UE monitors PDCCH for RAR reception based at least in part on ra-SearchSpace. UE performs RAR reception based at least in part on ra-ResponseWindow and ra-SearchSpace. UE monitors PDCCH for contention resolution based at least in part on ra-SearchSpace.ra-ResponseWindow If the selected featureCombinationParameter is included in the first rach-ConfigCommon, and if the selected featureCombinationParameter does not include ra-ResponseWindow, UE applies ra-ResponseWindow in the non-extended part of the first RACH-ConfigCommon.

If the selected featureCombinationParameter is included in the first rach-ConfigCommon, and if the selected featureCombinationParameter includes ra-ResponseWindow, UE applies ra-ResponseWindow in the selected featureCombinationParameter.

If the first RACH-ConfigCommon is selected because there is no featureCombination matching with the target featureCombination, UE applies ra-ResponseWindow in the non-extended part of the first RACH-ConfigCommon.

If the selected featureCombinationParameter is included in the second rach-ConfigCommon, and if the selected featureCombinationParameter does not include ra-ResponseWindow, UE applies ra-ResponseWindow in the non-extended part of the second RACH-ConfigCommon.

If the selected featureCombinationParameter is included in the second rach-ConfigCommon, and if the selected featureCombinationParameter includes ra-ResponseWindow, UE applies the ra-ResponseWindow in the selected featureCombinationParameter of the selected second RACH-ConfigCommon.

If the selected featureCombinationParameter is included in the first rach-ConfigCommon, and if the selected featureCombinationParameter does not include ra-SearchSpace, UE applies ra-SearchSpace in the non-extended part of the PDCCH-ConfigCommon of the DL BWP associated with the UL BWP. The UL BWP is either initial UL BWP (if UE is RRC_IDLE or RRC_INACTIVE) or currently active UL BWP (if UE is RRC_CONNECTED).

If the selected featureCombinationParameter is included in the first rach-ConfigCommon, and if the selected featureCombinationParameter include ra-SearchSpace, UE applies ra-SearchSpace in the selected featureCombinationParameter of the first RACH-ConfigCommon of the UL BWP.

If the first RACH-ConfigCommon is selected because there is no featureCombination matching with the target featureCombination, UE applies ra-SearchSpace in the non-extended part of the PDCCH-ConfigCommon of the DL BWP associated with the UL BWP.

If the selected featureCombinationParameter is included in the second rach-ConfigCommon, and if the selected featureCombinationParameter does not include ra-SearchSpace, UE applies ra-SearchSpace in the extended part of the PDCCH-ConfigCommon of the DL BWP associated with the UL BWP.

If the selected featureCombinationParameter is included in the second rach-ConfigCommon, and if the selected featureCombinationParameter include ra-SearchSpace, UE applies ra-SearchSpace in the selected featureCombinationParameter of the second RACH-ConfigCommon of the UL BWP.

GNB includes zero or one pusch-TimeDomainAllocationList in the non-extended part of the PUSCH-ConfigCommon.

GNB includes zero or one or more pusch-TimeDomainAllocationList in the extended part of the PUSCH-ConfigCommon.

GNB includes zero or one pusch-TimeDomainAllocationList in each featureCombinationParameter of the first RACH-ConfigCommon.

GNB includes zero or one pusch-TimeDomainAllocationList in each featureCombinationParameter of the second RACH-ConfigCommon.

UE determines the time slot for PUSCH transmission scheduled by RAR based at least in part on pusch-TimeDomainAllocationList.

If the selected featureCombinationParameter is included in the first rach-ConfigCommon, and if the selected featureCombinationParameter does not include pusch-TimeDomainAllocationList, and if pusch-TimeDomainAllocationList is included in the non-extended part of the PUSCH-ConfigCommon of the UL BWP, UE applies the pusch-TimeDomainAllocationList in the non-extended part of the PUSCH-ConfigCommon of the UL BWP. The UL BWP is initial UL BWP (if the UE is RRC_IDLE or RRC_INACTIVE) or the currently active UL BWP (if the UE is RRC_CONNECTED).

If the selected featureCombinationParameter is included in the first rach-ConfigCommon, and if the selected featureCombinationParameter does not include pusch-TimeDomainAllocationList, and if pusch-TimeDomainAllocationList is not included in the non-extended part of the PUSCH-ConfigCommon of the UL BWP, UE applies the default PUSCH time domain resource allocation table.

If the selected featureCombinationParameter is included in the first rach-ConfigCommon, and if the selected featureCombinationParameter includes pusch-TimeDomainAllocationList, UE applies pusch-TimeDomainAllocationList in the selected featureCombinationParameter.

If the first RACH-ConfigCommon is selected because there is no featureCombination matching with the target featureCombination, and if pusch-TimeDomainAllocationList is included in the non-extended part of the PUSCH-ConfigCommon of the UL BWP, UE applies the pusch-TimeDomainAllocationList in the non-extended part of the PUSCH-ConfigCommon of the UL BWP.

If the first RACH-ConfigCommon is selected because there is no featureCombination matching with the target featureCombination, and if pusch-TimeDomainAllocationList is not included in the non-extended part of the PUSCH-ConfigCommon of the UL BWP, UE applies the default PUSCH time domain resource allocation table.

If the selected featureCombinationParameter is included in the second rach-ConfigCommon, and if the selected featureCombinationParameter does not include pusch-TimeDomainAllocationList, and if corresponding pusch-TimeDomainAllocationList is included in the extended part of the PUSCH-ConfigCommon of the UL BWP, UE applies the corresponding pusch-TimeDomainAllocationList in the extended part of the PUSCH-ConfigCommon of the UL BWP.

If the selected featureCombinationParameter is included in the second rach-ConfigCommon, and if the selected featureCombinationParameter does not include pusch-TimeDomainAllocationList, and if the corresponding pusch-TimeDomainAllocationList is not included in the extended part of the PUSCH-ConfigCommon of the UL BWP, UE applies the default PUSCH time domain resource allocation table.

If the selected featureCombinationParameter is included in the second rach-ConfigCommon, and if the selected featureCombinationParameter includes pusch-TimeDomainAllocationList, UE applies pusch-TimeDomainAllocationList in the selected featureCombinationParameter.

GNB includes one pdsch-TimeDomainAllocationList in the non-extended part of the PDSCH-ConfigCommon.

GNB includes zero or one or more pdsch-TimeDomainAllocationList in the extended part of the PDSCH-ConfigCommon.

GNB includes zero or one pdsch-TimeDomainAllocationList in each featureCombinationParameter of the first RACH-ConfigCommon.

GNB includes zero or one pdsch-TimeDomainAllocationList in each featureCombinationParameter of the second RACH-ConfigCommon.

UE determines the start symbol and the number of symbols for PDSCH reception based at least in part on pdsch-TimeDomainAllocationList.

If the selected featureCombinationParameter is included in the first rach-ConfigCommon, and if the selected featureCombinationParameter does not include pdsch-TimeDomainAllocationList, UE applies the pdsch-TimeDomainAllocationList in the non-extended part of the PDSCH-ConfigCommon of the DL BWP associated with the UL BWP. The UL BWP is initial UL BWP (if the UE is RRC_IDLE or RRC_INACTIVE) and the currently active UL BWP (if the UE is RRC_CONNECTED).

If the selected featureCombinationParameter is included in the first rach-ConfigCommonIf the selected featureCombinationParameter is included in the first rach-ConfigCommon, and if the selected featureCombinationParameter includes pdsch-TimeDomainAllocationList, UE applies pdsch-TimeDomainAllocationList in the selected featureCombinationParameter.

If the first RACH-ConfigCommon is selected because there is no featureCombination matching with the target featureCombination, UE applies the pdsch-TimeDomainAllocationList in the non-extended part of the PDSCH-ConfigCommon of the DL BWP associated with the UL BWP.

If the selected featureCombinationParameter is included in the second rach-ConfigCommon, and if the selected featureCombinationParameter does not include pdsch-TimeDomainAllocationList, UE applies the corresponding pdsch-TimeDomainAllocationList in the extended part of the PDSCH-ConfigCommon of the DL BWP associated with the UL BWP.

If the selected featureCombinationParameter is included in the second rach-ConfigCommon, and if the selected featureCombinationParameter includes pdsch-TimeDomainAllocationList, UE applies pdsch-TimeDomainAllocationList in the selected featureCombinationParameter.

If an UL BWP and an DL BWP have a same bwp-Id, the UL BWP and the DL BWP are associated with (or linked to) each other.

Figure 3A:
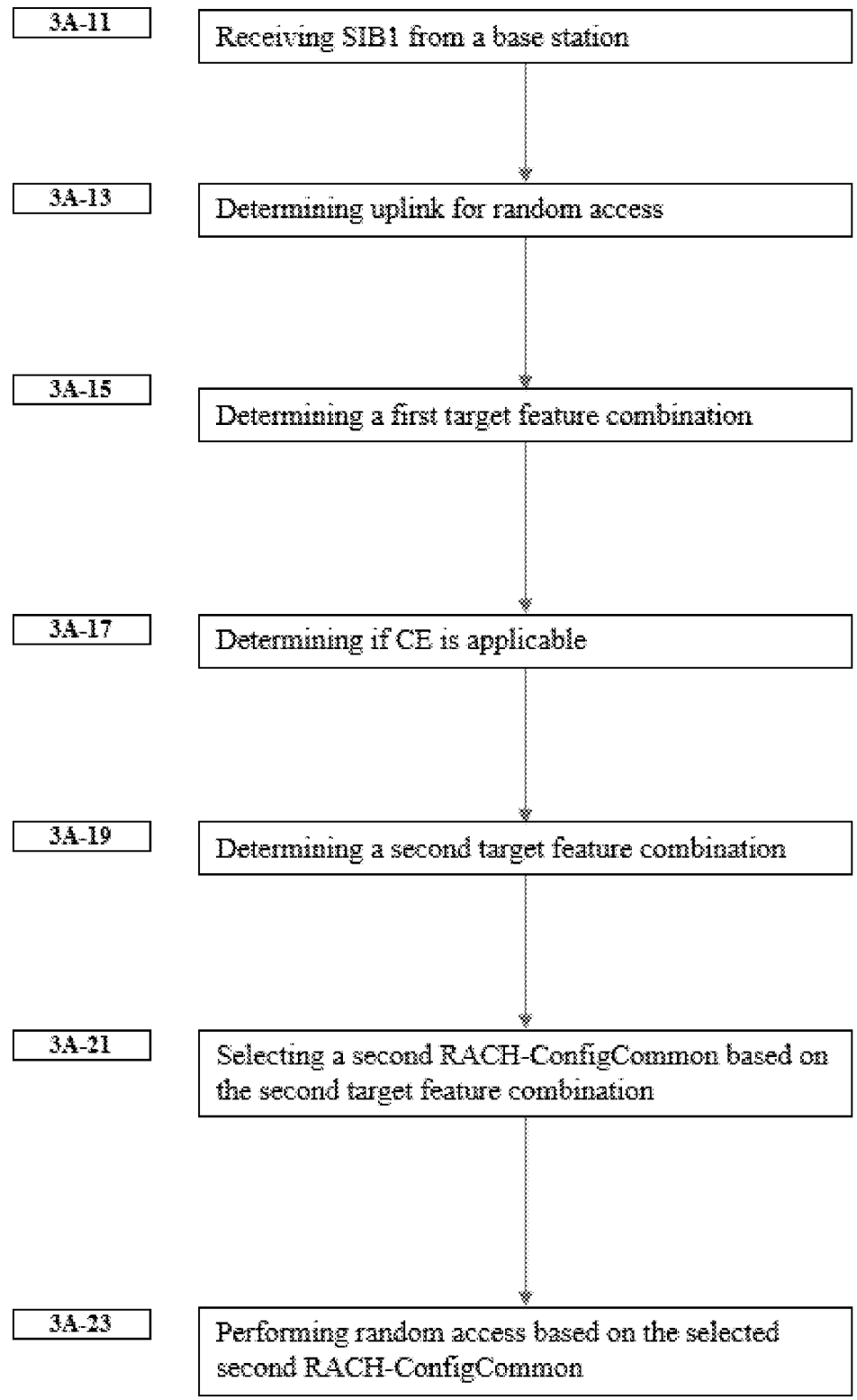
FIG. 3A is a flow diagram illustrating an operation of a terminal.

FIG. 3a illustrates the operation of the terminal.

In step 3A-11, the terminal receives SIB1 from the base station. SIB1 includes BWP-DownlinkCommon for initial DL BWP, first BWP-UplinkCommon for initial UL BWP of first uplink, and second BWP-UplinkCommon for initial UL BWP of second uplink, the first BWP-UplinkCommon includes a first RACH-ConfigCommon and a one or more second RACH-ConfigCommons, the second BWP-UplinkCommon includes a first RACH-ConfigCommon and a one or more second RACH-ConfigCommons, each of a one or more second RACH-ConfigCommons is associated with one or more feature combinations and RACH identifiers, where a feature combination consists of an optional single-valued field for RedCap, an optional single-valued field for SDT, an optional single-valued field for CE, and an optional multi-bit field for slice.

In step 3A-13, the terminal determines an uplink for a random access procedure based on rsrpThresholdSSB-SUL included in first RACH-ConfigCommon included in first BWP-UplinkCommon.

In step 3A-15, the terminal determines a first target feature combination. The first target feature combination may include slice-related features and RedCap features and does not include SDT features and CE features.

In step 3A-17, if the RSRP of the downlink path loss criterion is lower than the rsrp-ThresholdSSB-CE included in the first RACH-ConfigCommon of the selected uplink, the UE determines that the CE is applicable.

In step 3A-19, if the CE is determined to be applicable, the terminal determines a second target feature combination by adding CE in the first target feature combination.

In step 3A-21, the terminal selects a second RACH-ConfigCommon from the one or more second RACH-ConfigCommons of the selected uplink based on the comparison between the target feature combination and the one or more feature combinations associated with the one or more second RACH-ConfigCommons of the selected uplink.

In step 3A-23, the terminal performs a random access procedure based on the selected second RACH-ConfigCommon.

Figure 4A:
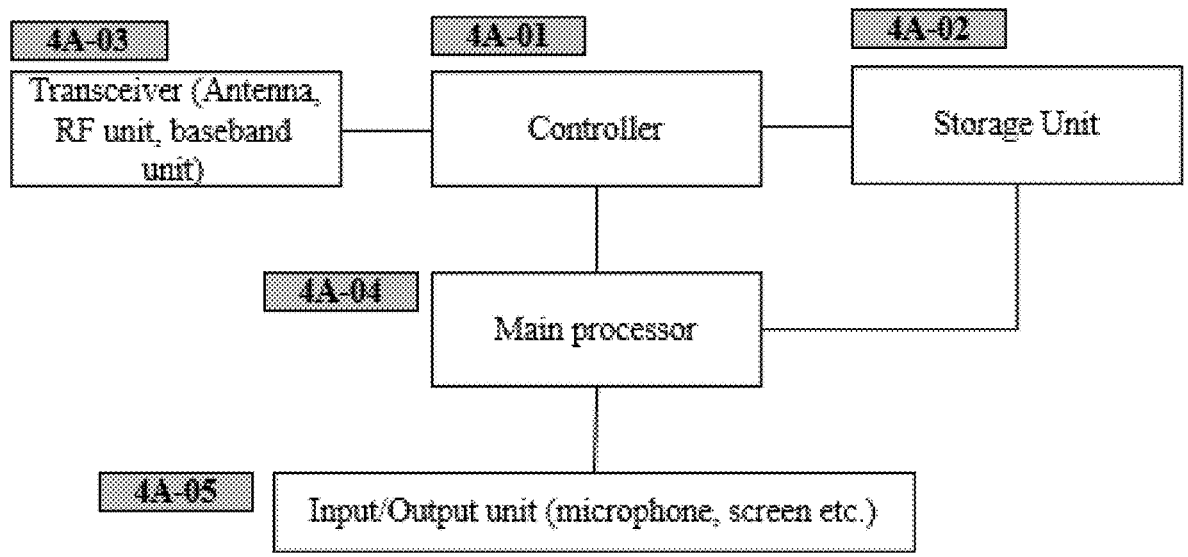
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
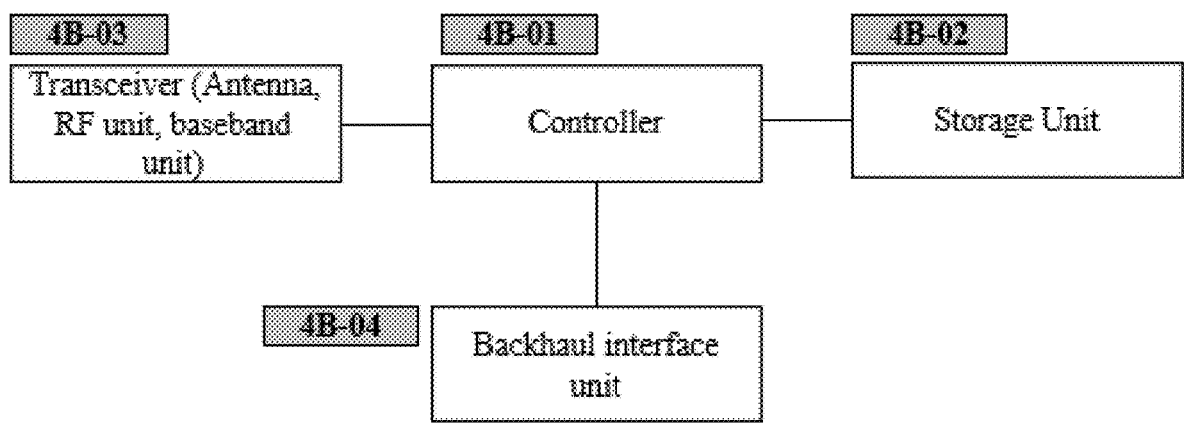
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method performed by a terminal, the method comprising:

receiving, by the terminal, a System Information Block1 (SIB1), wherein the SIB1 comprises one or more random access channel configuration common (RACH-ConfigCommon) parameters, wherein each of the one or more RACH-ConfigCommon parameters comprises zero or one or more pieces of feature-combination-related information, wherein each of the one or more pieces of feature-combination-related information comprises feature-combination information, wherein the feature-combination information of at least one of the one or more pieces of feature-combination-related information comprises:
- a reduced capability (redcap) field;
- a small data (smallData) field;
- a message3 repetition field; and
- a slice-related field, and wherein each of the redcap field, the smallData field, and the message3 repetition field comprises one bit indicating a single value, respectively;

selecting, by the terminal, a piece of feature-combination-related information of the one or more pieces of feature-combination-related information, wherein feature-combination information that comprises at least one feature that triggers a random access is selected based on feature-combination-related information corresponding to feature-combination information that comprises all features triggering the random access not existing; and performing, by the terminal and based on the piece of feature-combination-related information and first information in a RACH-ConfigCommon parameter, of the one or more RACH-ConfigCommon parameters, that comprises the piece of feature-combination-related information, the random access.

2. The method of claim 1,
wherein the first information is a physical random access channel configuration index (prach-ConfigurationIndex) parameter.

3. The method of claim 1, wherein:
redcap is a part of a feature combination based on the redcap field being present in the feature-combination information, small data transmission is a part of a feature combination based on the smallData field being present in the feature-combination information, and a message 3 repetition is a part of a feature combination based on the message3 repetition field being present in the feature-combination information.

4. A terminal in a wireless communication system, the terminal comprising:

a transceiver configured to transmit and receive a signal; and a controller configured to control the transceiver to:
receive a System Information Block1 (SIB1), wherein the SIB1 comprises one or more random access channel configuration common (RACH-Config-Common) parameters, wherein each of the one or more RACH-ConfigCommon parameters comprises zero or one or more pieces of feature-combination-related information, wherein each of the one or more pieces of feature-combination-related information comprises feature-combination information, wherein the feature-combination information of at least one of the one or more pieces of feature-combination-related information comprises:
- a reduced capability (redcap) field;
- a small data (smallData) field;
- a message3 repetition field; and
- a slice-related field, and wherein each of the redcap field, the smallData field, and the message3 repetition field comprises one bit indicating a single value, respectively;

select a piece of feature-combination-related information of the one or more pieces of feature-combination-related information, wherein feature-combination information that comprises at least one feature that triggers a random access is selected based on feature-combination-related information corresponding to feature-combination information that comprises all features triggering the random access not existing; and perform, based on the piece of feature-combination-related information and first information in a RACH-ConfigCommon parameter, of the one or more RACH-ConfigCommon parameters, that comprises the piece of feature-combination-related information, the random access.

5. A method performed by a base station, the method comprising:

transmitting, by the base station, a System Information Block1 (SIB1), wherein the SIB1 comprises one or more random access channel configuration common (RACH-ConfigCommon) parameters, wherein each of the one or more RACH-ConfigCommon parameters comprises zero or one or more pieces of feature-combination-related information, wherein each of the one or more pieces of feature-combination-related information comprises feature-combination information, wherein the feature-combination information of at least one of the one or more pieces of feature-combination-related information comprises:
- a reduced capability (redcap) field;
- a small data (smallData) field;
- a message3 repetition field; and
- a slice-related field, and wherein each of the redcap field, the smallData field, and the message3 repetition field comprises one bit indicating a single value, respectively; and performing, by the base station with a terminal, a random access, wherein a piece of feature-combination-related information of the one or more pieces of feature-combination-related information is selected, wherein feature-combination information that comprises at least one feature that triggers the random access is selected based on feature-combination-related information corresponding to feature-combination information that comprises all features triggering the random access not existing, and wherein the random access is based on the selected piece of feature-combination-related information and first information in a RACH-ConfigCommon parameter, of the one or more RACH-ConfigCommon parameters, that comprises the piece of feature-combination-related information.

* * * * *

UNITED STATES PATENT AND TRADEMARK OFFICE
CERTIFICATE OF CORRECTION

PATENT NO. : 12,144,034 B2  
APPLICATION NO. : 18/542785  
DATED : November 12, 2024  
INVENTOR(S) : Soenghun Kim Page 1 of 1

It is certified that error appears in the above-identified patent and that said Letters Patent is hereby corrected as shown below:

On the Title Page

Item (30) Foreign Application Priority Data: after  
Feb. 7. 2022 (KR) ............... 10-2022-0015439; please add:  
-- Feb. 7. 2022 (KR) ............... 10-2022-0015440  
Feb. 7. 2022 (KR) ............... 10-2022-0015441  
Feb. 7. 2022 (KR) ............... 10-2022-0015442  
Feb. 7. 2022 (KR) ............... 10-2022-0015443  
Feb. 7. 2022 (KR) ............... 10-2022-0015444  
Feb. 7. 2022 (KR) ............... 10-2022-0015445 --.

Signed and Sealed this  
Third Day of June, 2025

Coke Morgan Stewart  
*Acting Director of the United States Patent and Trademark Office*